United States Patent [19]

Arbeiter et al.

[11] Patent Number: 4,603,350
[45] Date of Patent: Jul. 29, 1986

[54] INTERLACED DIGITAL VIDEO INPUT FILTER/DECIMATOR AND/OR EXPANDER/INTERPOLATOR FILTER

[75] Inventors: James H. Arbeiter, Hopewell; Roger F. Bessler, Lawrenceville, both of N.J.

[73] Assignee: RCA Corporation, Princeton, N.J.

[21] Appl. No.: 685,239

[22] Filed: Dec. 21, 1984

[51] Int. Cl.⁴ .................................................. H04N 7/01
[52] U.S. Cl. ...................................... 358/140; 358/11
[58] Field of Search ................. 358/140, 133, 137, 11; 364/723, 724, 725

[56] References Cited

U.S. PATENT DOCUMENTS 4,447,886  5/1984  Meeker ........................... 358/133 X

FOREIGN PATENT DOCUMENTS 2097219  10/1982  United Kingdom ................. 358/140

OTHER PUBLICATIONS

C. Rochiere et al., *Multirate Digital Signal Processing*, Published by Prentice Hall, Inc., 1983, pp. 79–88.
Peter J. Burt, et al., "The Laplacian Pyramid as a Compact Image Code", *IEEE Transactions on Communications*, vol. COM-31, No. 4, Apr. 1983, pp. 532–549.

*Primary Examiner*—James J. Groody
*Assistant Examiner*—Kostak Victor R.
*Attorney, Agent, or Firm*—Joseph S. Tripoli; George E. Haas; George J. Seligsohn

[57] ABSTRACT

Reduction of storage capacity required by one dimensional digital filter/decimator and/or expander/interpolation filter for spatially filtering that given dimension of a scanned two-dimensional image, represented by a temporal video signal, which is orthogonal to raster scan lines. Such filter devices are particularly suitable for use in Burt Pyramid image processing systems.

22 Claims, 24 Drawing Figures

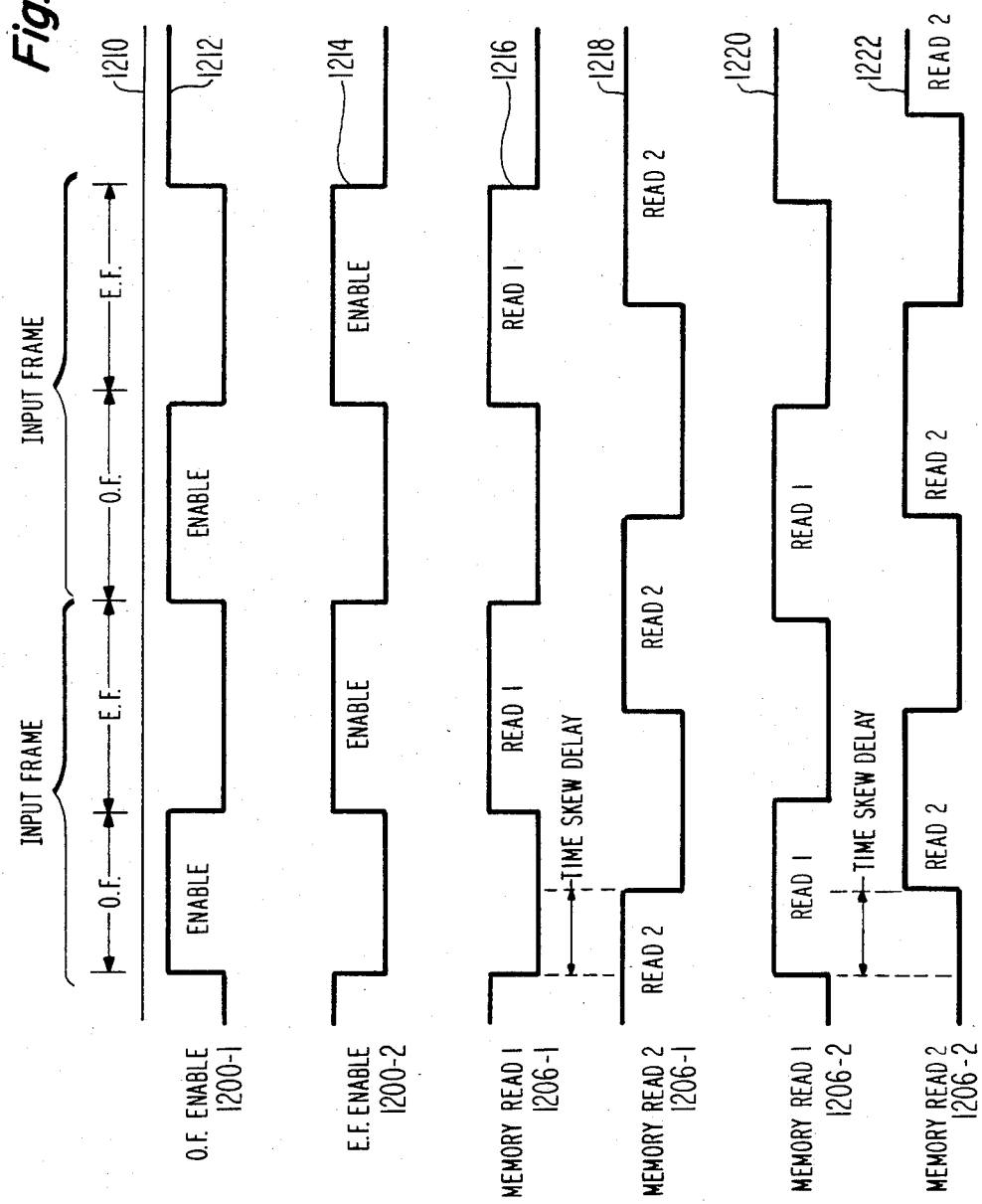

INTERLACED DIGITAL VIDEO INPUT FILTER/DECIMATOR AND/OR EXPANDER/INTERPOLATOR FILTER

BACKGROUND OF THE INVENTION

I. Field of the Invention

This invention relates to a system for image processing an interlaced digital video input signal and, more particularly, to such a system incorporating filter apparatus comprised of one or more multitap digital filter/decimators and/or expander/interpolation filters suitable for image processing, in real time, two-dimensional images, such as television images, employing an interlaced scanning raster.

II. Description of the Prior Art

Reference is made to co-pending U.S. patent application Ser. No. 596,817, filed Apr. 4, 1984 by Carlson et al., and assigned to the same assignee as the present application. This co-pending Carlson et al. application discloses real-time hierarchal pyramid signal processing apparatus which employs pipe-line architecture for analyzing in delayed real time, inter alia, the two-dimensional spatial frequency spectrum of television images defined by a temporal video signal, and for synthesizing in delayed real time such a temporal video signal from the analyzed frequency spectrum thereof. In particular, the signal processing apparatus disclosed in this co-pending Carlson et al. application is capable of implementing an algorithm, developed by Dr. Peter J. Burt (hereinafter referred to as the "Burt Pyramid") by means which include many digital convolution filters, decimators, expanders, and interpolation filters, all operating on a stream of multibit (e.g., 8-bit) digital signal samples. In the past, the total amount of hardware required for the structure of such digital convolution filters, decimators, expanders and interpolation filters was quite large and, hence, relatively expensive.

Reference is further made to pages 79–88 of the book *Multirate Digital Signal Processing*, by C. Rochiere et al., published by Prentice Hall, Inc., in 1983, which discusses the use of polyphase component filters for decimation and interpolation with integer changes in sampling rate.

Reference is further made to co-pending U.S. patent application Ser. No. 632,467, filed July 19, 1984, by Arbeiter, and assigned to the same assignee as the present application. This co-pending Arbeiter application discloses improved-structure input-weighted multitap digital filters that incorporate a plurality of polyphase component filters and which are suitable for use as a filter/decimator and/or an expander/interpolation filter.

SUMMARY OF THE INVENTION

The present invention is directed to an improvement in filter apparatus comprised of one-dimensional m-tap digital filter/decimators and/or expander-interpolation filters used in a system for digitally processing, in real time, an applied interlaced video-input digital signal. The video-input signal is temporally comprised of successively-occurring scan-lines of pixel samples of at least one frame composed of F separate line-interlaced scanning fields of a raster-scanned two-dimensional image, where F is a first plural integer. The number of taps m of such a digital filter-decimator and/or expander-interpolation filter is larger than F. Further, the filter-decimator and/or expander-interpolation filter is operative in that one of the two dimensions of the image that is orthogonal to the raster scan lines for deriving a video output digital signal comprised of successively-occurring scan-lines of pixel samples. Associated with each of the m taps is a predetermined multiplier coefficient.

The improved filter-decimator and/or expander/interpolation filter of the present invention is comprised of F partial filters all of which share in common one or more of a set of D delay means, where D is a predetermined integer having a value such that $D < (m-1)$, each of which delay means is capable of storing one scan-line of pixel samples. Each of the F partial filters has a separate and distinct subset of the m predetermined multiplier coefficients individually associated therewith, the maximum number of the coefficients contained in any of the subsets being no greater than $(D+1)$.

The improved filter-decimator and/or expander-interpolation filter further comprises a scan converter comprised of a memory and means including a summer that are coupled to the plurality of F partial filters in accordance with the ordinal value of the then-occurring one of the F separate line-interlaced scanning fields. The memory and the means including the summer are operative during the successive occurrences of each of the F separate line-interlaced scanning fields of the frame of the video-input signal to sum corresponding pixel samples applied thereto that are derived from the respective outputs of each of the F partial filters.

BRIEF DESCRIPTION OF THE DRAWING

FIG. 12a is a timing diagram helpful in explaining the operation of the FIG. 12 embodiment.

DESCRIPTION OF THE PREFERRED EMBODIMENTS

The real-time Burt Pyramid disclosed in the aforesaid co-pending Carlson et al. patent application requires that a video input to the Burt Pyramid analyzer be in the form of a stream off digital pixel samples representing a progressively scanned two-dimensional image. Thus, if the video input is originally in analog form, it must be passed through an analog-to-digital (A/D) converter to derive the digital pixel samples. Further, if the video input is originally in a line-interlaced format, it must be converted to a progressive-scan format prior to being applied to the Burt Pyramid analyzer disclosed in the aforesaid co-pending Carlson et al. patent application.

Each successive frame of a standard television signal, such as an NTSC video signal, is an analog signal comprised of an odd scanning field followed by an even scanning field line-interlaced therewith. For illustrative purposes, in describing the present invention, it will be assumed that the line-interlaced video input is an NTSC video signal. However, it should be understood that the present invention is not limited to a frame comprised of only two line-interlaced scanning fields, but applies to a frame comprised of any plural number F of line-interlaced fields.

Figure 1:
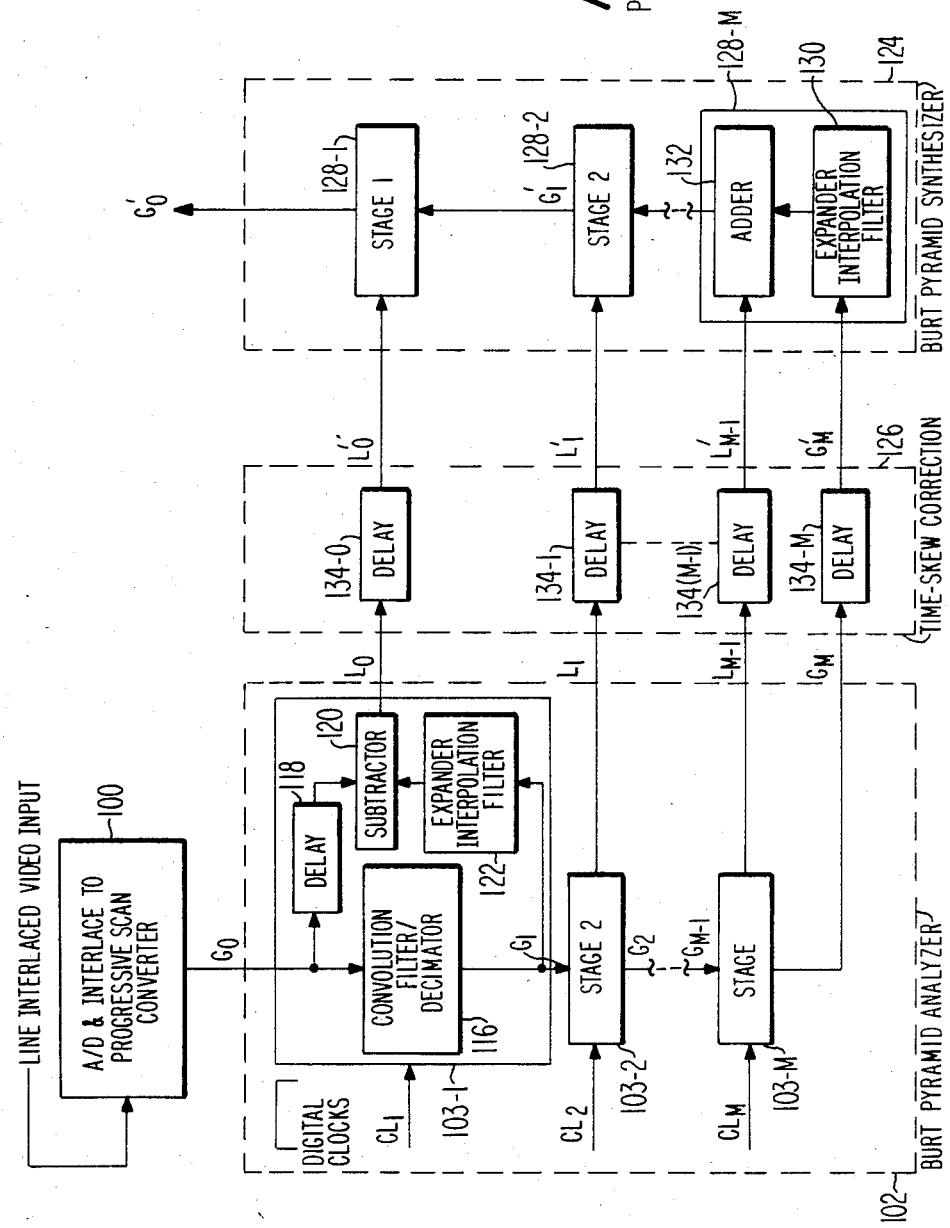
FIG. 1 is a functional block diagram of a prior-art arrangement of a Burt Pyramid analyzer and synthesizer system responsive to a line-interlaced video input.
Figure 1A:
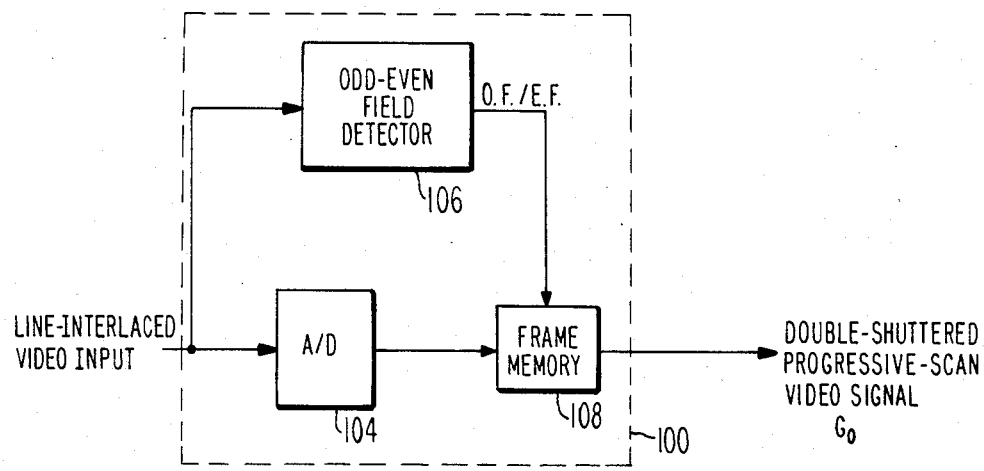
FIG. 1a is an illustrative embodiment of the analog-to-digital (A/D) and interlace to progressive-scan converter of FIG. 1.

As indicated in FIG. 1, in the past, a line-interlaced video input, such as an NTSC video signal, is passed through A/D and interlace to progessive-scan converter 100, before being applied as an input signal $G_0$ to Burt Pyramid analyzer 102. A/D and interlace to progressive-scan converter 100 requires that one or more scanning fields be stored in a memory. FIG. 1a is an illustrative embodiment of block 100, employing a frame memory for providing a double-shuttered progressive-scan output.

Referring to FIG. 1a, a line-interlaced video input is applied as an input to both A/D converter 104 and to odd/even field detector 106. A/D 104 converts a line-interlaced video input into a stream of digital pixel samples at a given sampling rate. Each pixel sample is composed of a given multibit binary number that defines the amplitude level of that pixel sample. The usual sampling rate for an NTSC video input signal is four times the color sub-carrier frequency (i.e. 14.32 MHz). Further, the amplitude level of each of the stream of digital pixel samples emerging from A/D converter 104 is usually defined by eight bits. Odd/even field detector 106, known in the television art, responds to the line-interlaced video input thereto for deriving a control output O.F/E.F signal indictative of whether the current scanning field is an odd field (O.F) or is an even field (E.F.). Frame memory 108, which has a storage capacity sufficient to store all of the multibit digital pixel samples in an entire input frame, operates at an output pixel sample rate twice that of its input sample rate.

More specifically, during the occurrence of the odd field of each successive input frame, the pixel samples of the entire stored immediately preceding frame are serially read out from memory 108 at twice the aforesaid given rate. While this is happening, each readout pixel sample of the odd field of the immediately preceding frame is replaced in memory by the corresponding one of the pixel samples of the odd field of the current frame, which are serially applied to memory 108 at the aforesaid given rate. Then, during the occurrence of the even field of each successive input frame, while the pixel samples of each individual line of the even field of the current frame are serially applied to memory 108 for storage, the stored pixel samples of the preceding line of the odd field of that current frame are first serially read out (without erasure) at twice the aforesaid current rate and then the stored pixel samples of that individual line are read out at twice the given rate. Therefore, each stored full frame of pixel samples is read out twice from memory 108 during the occurrence of a frame period. The first readout takes place essentially during the occurrence of the even input field of the frame then being read out, and the second readout takes place essentially during the occurrence of the odd input field of the frame that immediately follows the frame then being read out.

The required storage capacity of frame memory 108 is quite large. Particularly, each of the odd and even scanning fields of an NTSC video signal frame contains 241 or 242 active scan lines. Each of these scan lines is comprised of about 800 pixel samples (assuming a sampling rate of 14.32 MHz), with each pixel sample being defined by eight bits. Thus, the required storage capacity of frame memory 108 is in excess of 3 megabits.

Returning to FIG. 1, Burt Pyramid analyzer 102 (described in detail in the aforesaid co-pending Carlson, et al. patent application) is comprised of a pipeline of M generally similar sampled-signal translation stages 103-1, 103-2 ... 103-M. Each of the respective stages operates at a sample rate determined by the frequency of the digital clock signals $CL_1$, $CL_2$ ... $CL_M$ individually applied thereto. The frequency of the clock applied to any particular one of the stages is lower than the frequency of the clock applied to any stage that precedes it. Preferably, the frequency of each of the clocks of stages 103-2 ... 103-M is one-half of the clock of the immediately preceding stage. In the following description it will be assumed that this preferable relationship among the clocks $CL_1$ ... $CL_M$ is the case.

As indicated in FIG. 1, stage 103-1 is comprised of convolution filter/decimator 116, delay means 118, subtractor 120 and expander/interpolation filter 122.

An input stream of digital samples $G_0$ from converter 100 having a sample rate (e.g. 14.32 MHz) equal to the frequency of clock signal $CL_1$ is applied through convolution filter/decimator 116 to derive an output stream of digital samples $G_1$ at a sample rate equal to the frequency of clock signal $CL_2$. The convolution filter has a low pass function that reduces the center spatial frequency of each image dimension represented by $G_1$ to one-half of the center-spatial frequency of the corresponding dimension represented by $G_0$. At the same time, the decimation reduces the sample density in each dimension by one-half.

The respective digital samples of $G_0$ are applied through delay means 118 as a first input to subtractor 120. At the same time, the reduced-density digital samples of $G_1$ are applied to expander/interpolation filter 122, which increases the sample density of the $G_1$ samples back to that of $G_0$. Then, the expanded density interpolated $G_1$ samples are applied as a second input to subtractor 120. The presence of delay means 118 ensures that each pair of samples of $G_0$ and $G_1$, which correspond with one another in spatial position, are applied to the first and second inputs of subtractor 120 in time coincidence with one another. The output stream of successive samples $L_0$ from subtractor 120 defines the highest spatial frequency octave in each dimension of the scanned image.

The structure of each stages 103-2 ... 103-M is essentially the same as that of stage 103-1. However, each of the higher ordinal numbered stages 103-2 ... 103-M operates on lower spatial frequency signals occurring at lower sample densities than its immediately preceding stage. More specifically, the output stream of successive samples $L_1$ represents the next-to-highest octave of spatial frequencies in each image dimension, etc., so that, as indicated in FIG. 1, the Burt Pyramid analyzed signal is comprised of respective octave sample streams $L_0 ... L_{M-1}$ (derived respectively from the subtractor of each of stages I03-1 ... 103-M) together with a low-frequency remnant signal $G_M$ (derived from the output of the convolution filter/decimator of stage 103-M).

The corresponding pixel samples of the respective outputs $L_0 ... L_{M-1}$ and $G_M$ of stages 103-1 ... 103-M of analyzer 102 do not occur in time of coincidence with one another due to intrinsic time delays inserted by the various convolution filter/decimators and expander/interpolation filters of stages 103-1 ... 103-M.

As indicated in FIG. 1, outputs $L_0 ... L_{M-1}$ and $G_M$ Burt Pyramid analyzer 102 are forwarded as an inputs to Burt Pyramid synthesizer 124 through time-skew correction means 126. In practice, one or more of output signals $L_0 ... L_{M-1}$ and $G_M$ may be altered or modified by alteration means, not shown, before being forwarded to synthesizer 124. However, in any case, after any alteration and time-skew correction, each of respective signals $L'_0 ... L'_{M-1}$ and $G'_M$ is applied as an input to stages 128-1 ... 128-M of synthesizer 124.

The signal $G'_0$, corresponding to the original signal $G_0$ applied to Burt Pyramid analyzer 102, is synthesized by synthesizer 124 operating on the pixel sample streams $L'_0 ... L'_{M-1}$ and $G'_M$. This is accomplished by applying the remnant sample stream $G'_M$, which occurs at the lowest sample density, as an input to expander/interpolation filter 130, which doubles the input sampling density of $G'_M$ in each of the image spatial dimensions represented thereby. Corresponding pixel samples at the output of expander/interpolation filter 130 and of the sample stream $L'_{M-1}$ (which corresponding pixel samples must occur in time coincidence with one another) are summed in adder 132. By iteration of this process through successive synthesis stages 128-(M−1) ... 128-1 (each of which also includes an expander/interpolation filter followed by an adder), the synthesizer output sample stream $G'_0$, defining the synthesized two-dimensional image at the original high sample density of $G_0$, is derived.

The respective expander/interpolation filters of each of the synthesizer stages 128-M ... 128-1 intrinsically inserts a time delay. These time delays are cumulative. However, it is essential that corresponding pixel samples at the two inputs at the respective adders of each of the synthesizer stages 128-M ... 128-1 occur in time coincidence with one another. Thus, while intrinsic time delays cause each pixel sample appearing at the $L_0$ output from analyzer 102 to occur significantly earlier than the corresponding pixel sample appearing at the $G_M$ output from analyzer 102, in order to compensate for the intrinsic time delays in the synthesizer it is necessary that each pixel sample appearing at the $G'_M$ input to synthesizer 124 occurs significantly earlier than the corresponding pixel sample appearing at the $L'_0$ input to synthesizer 124. Therefore, while any time delay inserted by delay means 134-M of time-skew correction means 126 is relatively small (even zero in some cases), the time delay inserted by delay means 134-0 of time-skew correction means 126 is relatively large—often being nearly a scanning-field time duration in length.

It normally takes 8 bits to represent the dynamic range of each pixel sample of the $G_0$ input to analyzer 102, which occurs at the highest sample density. The $L_0$ output from analyzer 102 also occurs at this highest sample density. If 8 bits were required for the dynamic range of each pixel sample of $L_0$, the storage capacity in bits required of delay means 134-0 would be very large. However, because (1) $L_0$ represents only the highest octave of the frequency spectrum of $G_0$, (2) the dynamic range of the high-frequency portion of a television-image video signal tends to be relatively small and (3) the human visual system is relatively insensitive to small changes in contrast of high spatial frequency components of an image, it may be possible to employ fewer than 8 bits of storage to represent the amplitude level of each pixel sample in delay means 134-0. However, the required storage capacity of delay means 134-0 is still quite large. On the other hand, while each one of delay means 134-1 ... 134-M of time-skew correction means 126 must store 8 bits per pixel sample, it inserts a smaller time delay and operates on a lower sample-density signal than does its immediately preceding one of delay means 134-0 ... 134-(M−1). Therefore, as the ordinal value of each delay means of time-skew correction means 126 becomes larger, the required storage capacity for that delay means becomes significantly smaller. Nevertheless, the total storage capacity of all the delay means of time-skew correction means 126 plus the storage capacity of frame memory 108 in FIGS. 1 and 1a is very large.

Figure 2A:
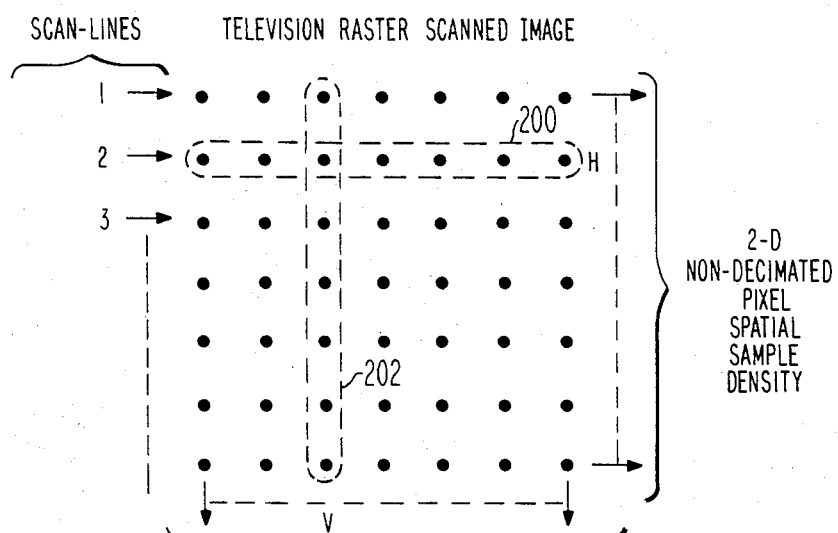
FIGS. 2a and 2b are diagrams illustrating, respectively, two-dimensional (2-D) non-decimated and decimated pixel (picture element) spatial density television-raster scanned images, such as those operated on by the Burt Pyramid analyzer and synthesizer of FIG. 1.
Figure 2B:
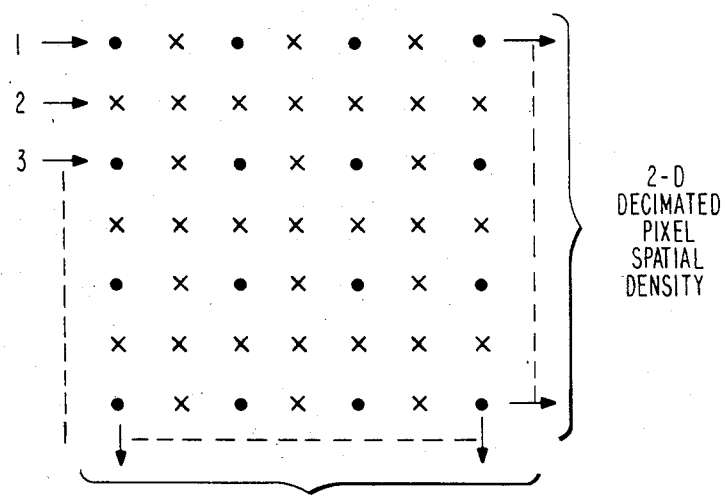

For a better understanding of what is involved in the decimation (or, alternatively, the expansion) of the pixel spatial sample density of a 2-D raster scanned image, reference is made to FIGS. 2a and 2b. FIG. 2a shows a two-dimensional spatial matrix of image samples arranged in horizontal rows and vertical columns. As is conventional in television, sample rows are horizontally scanned in a predetermined sequence (the sequence being different for progressive scan and interlaced scan). In any case, two spatially adjacent horizontal samples (such as the group of horizontal samples 200 of scan line 2) are scanned one after another. However, this is not true of two spatially adjacent vertical samples (such as those contained in vertical column 202 of samples of the television-raster scanned image). The scanning of two vertically adjacent samples of column 202 is temporally separated from one another by the total number of samples in each horizontal scan line (e.g., up to 800 samples).

The Burt Pyramid employs convolution filters and interpolation filters each utilizing a kernel weighting function having three or more taps corresponding to each dimension thereof. While three taps is the minimum number of required taps, it is preferable that the number of taps corresponding to each dimension thereof be a higher odd integer, such as 5, 7, or 9, for example. Further, in the case of a 2-D image, each filter can be either non-separable or separable. A non-separable 2-D filter employs a single 2-D kernel weighting function. A separable 2-D filter is comprised of two 1-D filters coupled in cascade. Each of the 1-D filters operates on a different one of two orthogonal dimensions (preferably horizontal and vertical) and each employs a 1-D kernel weighting function. In the past, filtering in the vertical direction required delay means capable of storing at least (m−1) lines of pixel samples, where m is the number of kernel weighting function taps in the vertical direction.

In the foregoing discussion, it is plain that the implementation of a prior-art (FIG. 1) Burt Pyramid system responsive to a line-interlaced video input required a very large amount of memory hardware to provide all the needed vertical-filter line-delay storage, time-skew correction delay storage and progressive-scan converter frame storage. The present invention is directed to significantly reducing the total amount of memory storage capacity required to implement a Burt Pyramid system responsive to a line-interlaced video input. The present invention is further directed to reducing the amount of line-delay memory capacity required to implement filter apparatus including a filter-decimator and/or an expander/interpolation filter responsive to a line-interlaced video input, regardless of whether or not such filter apparatus is employed in a Burt Pyramid system.

Figures 3, 4:
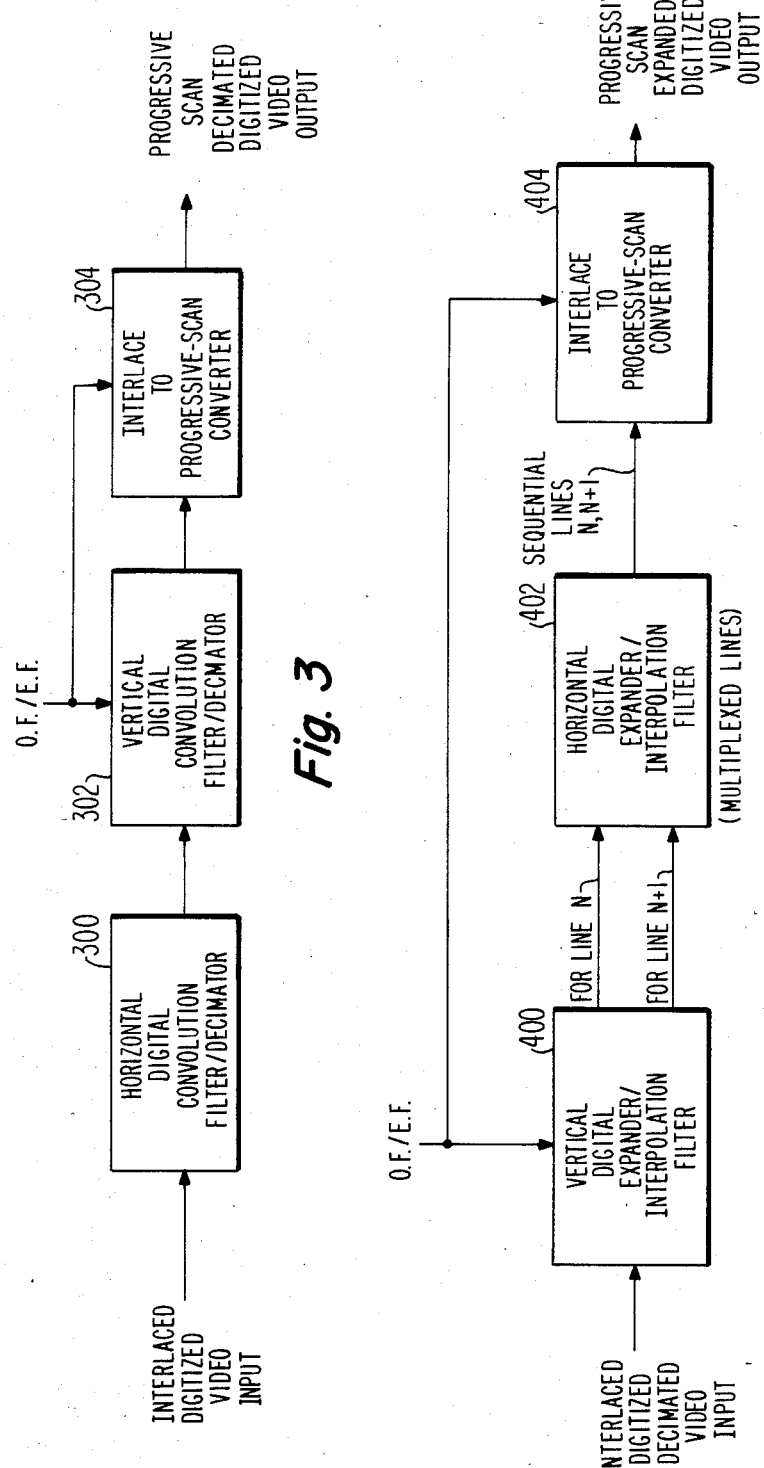
FIG. 3 is a block diagram of one embodiment of a filter/decimator incorporating the present invention.
FIG. 4 is a block diagram of one embodiment of an expander/interpolation filter incorporating the present invention.

FIG. 3 is a functional block diagram of a separable two-dimensional convolution filter/decimator responsive to an interlaced digitized video input that incorporates the present invention. More specifically, the interlaced digitized video input is applied to one-dimensional horizontal digital convolution filter/decimator 300, which is conventional in structure. The output of horizontal filter/decimator 300 is applied as an input to one-dimensional vertical digital convolution filter/decimator 302. Vertical filter/decimator 302 is structurally implemented in the form shown either in FIG. 7 or in FIG. 8, which are discussed in detail below. The output from vertical filter/decimator 302 is applied as an input to interlace to progressive-scan converter 304. Converter 304 is structurally implemented in the form shown in any one of FIGS. 10a, 10b or 10c. As is further shown in FIG. 3, vertical filter/decimator 302 and converter 304 are controlled by an odd-even field (O.F./E.F.) control signal applied to each of them. Conventional horizontal filter/decimator 300 performs the function of reducing the pixel sample density in the line-scan dimension (see FIG. 2a) by one-half. Thus, if the interlaced digitized video input has an 800 pixel samples per horizontal scan line sample density, the output from conventional filter/decimator 300 is only 400 pixel samples per horizontal scan line. This is desirable because it reduces the number of pixel samples that need to be stored in each line-delay means of vertical filter/decimator 302. However, the presence of conventional horizontal filter/decimator 300 is not essential to the present invention. In those cases in which it is desired to achieve only one-dimensional vertical (i.e. that one of the two image dimensions that is orthogonal to the scan-line dimension) filtering and decimation, an interlaced digitized video input can be applied directly to the input of vertical/decimator 302.

During the separate occurrences of each odd and each even field, vertical filter/decimator 302 during the odd field operates as a first partial filter, and then, during the even field, as a second partial filter. Each of these partial filters is comprised of a separate and distinct subset of the kernel weighting function multiplier coefficients of the vertical filter/decimator 302. This permits the same scan-line delay means to be used in common by each of the first and second partial filters by time dividing the use of the common scan-line delay means between the two partial filters in accordance with the then-occurring one of the odd and even scanning fields. In this manner, the number of required scan-line delay means employed by filter/decimator 302 may be reduced by as much as one-half with respect to the number of scan-line delay means required by a conventional vertical filter/decimator.

Converter 304 performs the function of combining the respective outputs from the first and second partial filters by summing corresponding pixel samples derived therefrom. This involves delaying each pixel sample derived from the output of the odd-field partial filter by the duration of a scanning field so that it occurs in time coincidence with the corresponding pixel sample derived from the output of the even-field partial filter.

Figure 6:
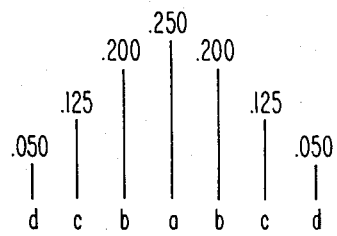
FIG. 6 illustrates an example of a symmetrical kernel weighting function of a type that can be employed in the convolution filter-decimators of FIG. 3 and in the interpolation filters of FIG. 4.
Figure 7:
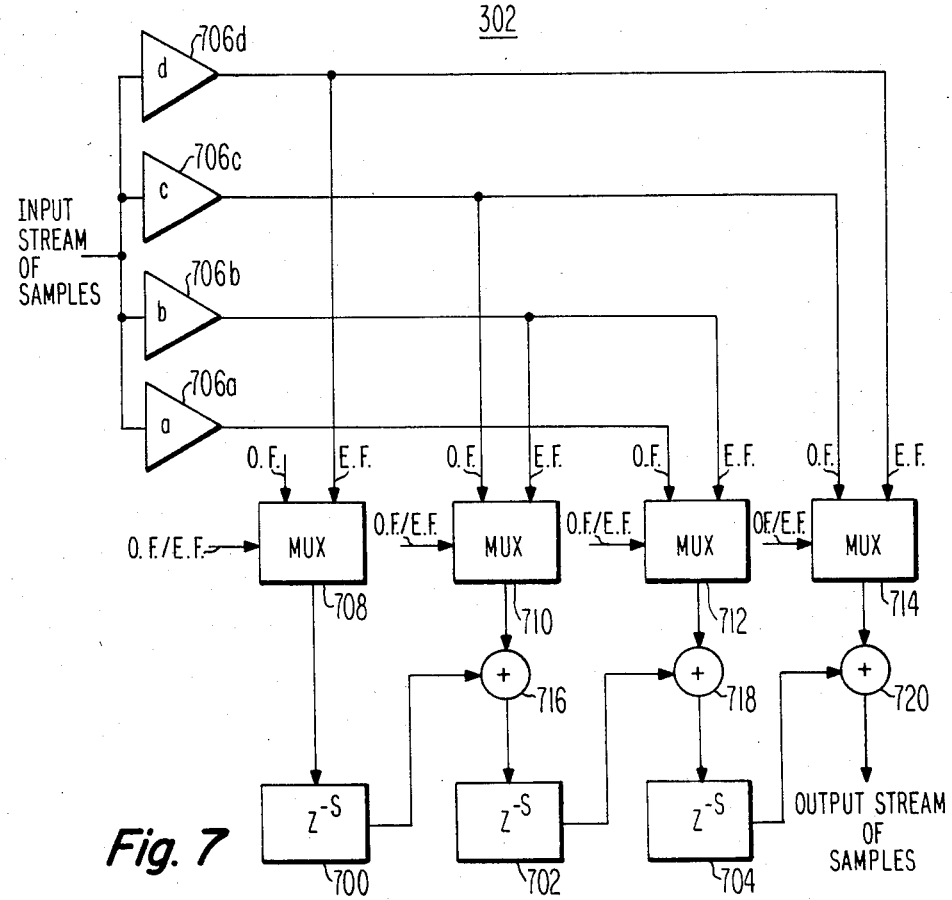
FIG. 7 is an illustrative embodiment of an input-weighted filter/decimator of a type that can be employed as the vertical digital convolution filter-decimator of FIG. 3.

For illustrative purposes, assume that vertical filter/decimator 302 operates as a seven-tap input-weighted filter having the configuration shown in FIG. 7, and that this filter employs the symmetrical seven multipler-coefficient kernel weighting function shown in FIG. 6. The configuration of FIG. 7 employs only three scan-line delay means 700, 702 and 704, each of which is capable of storing S pixel samples (where S is the number of pixel samples contained in each scan-line of the input stream of samples applied to FIG. 7). Each pixel sample of the input stream of samples is multiplied respectively by each of the four multiplier coefficients a, b, c, and d by respective multipliers 706a, 706b, 706c, and 706d. The output from d multiplier 706d is applied both to the even-field (E.F.) input of MUX 708 and MUX 714. The output from c multiplier 706c is applied to both the odd field (O.F.) input of MUX 710 and MUX 714. The output from b multiplier 706b is applied to both the E.F. input of MUX 710 and MUX 712. The output from a multiplier 706a is applied to the O.F. input of MUX 712. No signal at all is applied to the O.F. input of MUX 708. An O.F./E.F. control signal is applied to MUX 708, 710, 712, and 714 to cause the output from each of these MUX to be coupled to the O.F. input thereof during the occurrence of each odd field and to be coupled to the E.F. input thereof during the occurrence of each even field.

The output from MUX 708 is applied as an input to delay means 700. The output from MUX 710 is applied as a first input to summer 716. The output from MUX 712 is applied as a first input to summer 718. The output from MUX 714 is applied as a first input to summer 720. The output from delay means 700 is applied as a second input to summer 716 and the output from summer 716 is applied as an input to delay means 702. The output from delay means 702 is applied as a second input to summer 718 and the output from summer 718 is applied as an input to delay means 704. The output from delay means 704 is applied as a second input to summer 720 and the output from summer 720 constitutes the output stream of pixel samples from vertical filter/decimator 302.

During each odd field, the configuration of FIG. 7 operates as an input-weighted 3-tap partial filter employing three multiplier coefficients c, a, and c, respectively. However, during each even field, the configuration of FIG. 7 operates as a 4-tap partial filter employing the four multiplier coefficients d, b, b, and d, respectively. As indicated in FIG. 6, the multiplier coefficients c, a, and c of the first partial filter represent a first subset of the seven-coefficient kernel weighting function shown in FIG. 6, while the d, b, b, and d multiplier coefficients of the second partial filter represent the remaining subset of alternate ones at the seven-coefficient kernel weighting functions shown in FIG. 6.

As taught in the aforesaid co-pending Arbeiter patent application, an input-weighted vertical filter permits a reduction in the number of bits required to define the dynamic range of each pixel sample in one or more of delay means 700, 702 and 704. Since the number S of pixel samples per scan line is large, the use of the Arbeiter invention itself provides significant reduction in the required storage capacity of the delay lines employed in a vertical filter/decimator. For this reason, the preferred embodiment of vertical filter/decimator 302 incorporates an input-weighted filter having the configuration of FIG. 7.

Figure 8:
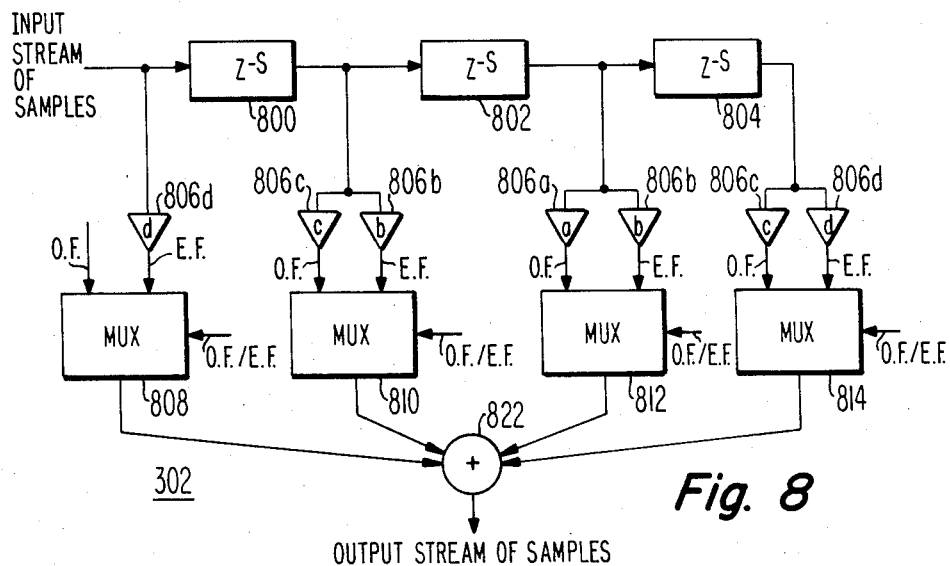
FIG. 8 is an illustrative embodiment of an output-weighted filter/decimator of a type that can be employed as the vertical digital convolution filter-decimator of FIG. 3.

However, vertical filter/decimator 302 may also be embodied by an output-weighted filter, such as that shown by the configuration of FIG. 8. In FIG. 8, respective elements 800, 802, 804, 806a, 806b, 806c, 806d, 808, 810, 812, and 814 correspond both functionally and structurally with respective elements 700, 702, 704, 706a, 706b, 706c, 706d, 708, 710, 712 and 714 of FIG. 7. The output-weighted configuration of FIG. 8 differs from the input-weighted of the configuration of FIG. 7 by applying the input stream of sample to delay means 800, 802 and 804 prior to multiplication by the multiplier coefficients a, b, c, and d. Further, the output stream of pixel samples in the configuration of FIG. 8 is achieved by a single summation of all of the weighting function products of each of the partial filters by summer 822, rather than by a series of partial summations (as is the case in the input-weighted filter configuration of FIG. 7).

Figure 10A:
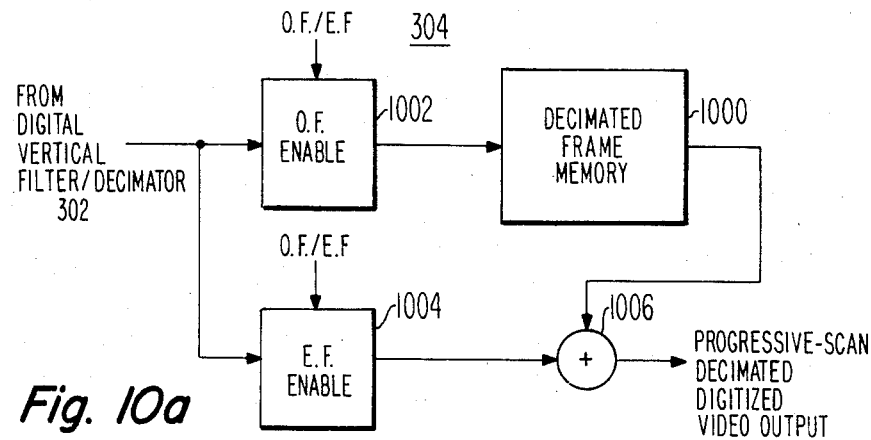
FIGS. 10a, 10b and 10c, respectively, illustrate different embodiments of the interlace to progrssive-scan converter of FIG. 3.
Figure 10B:
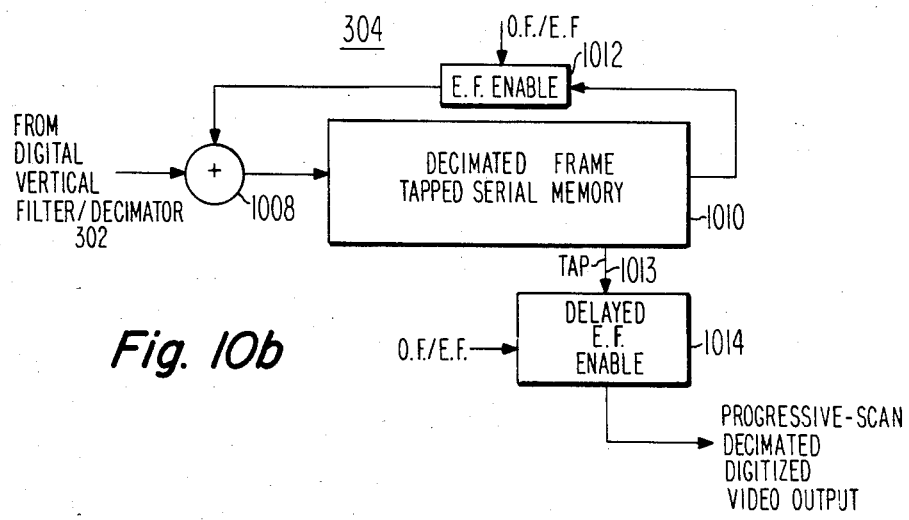
Figure 10C:
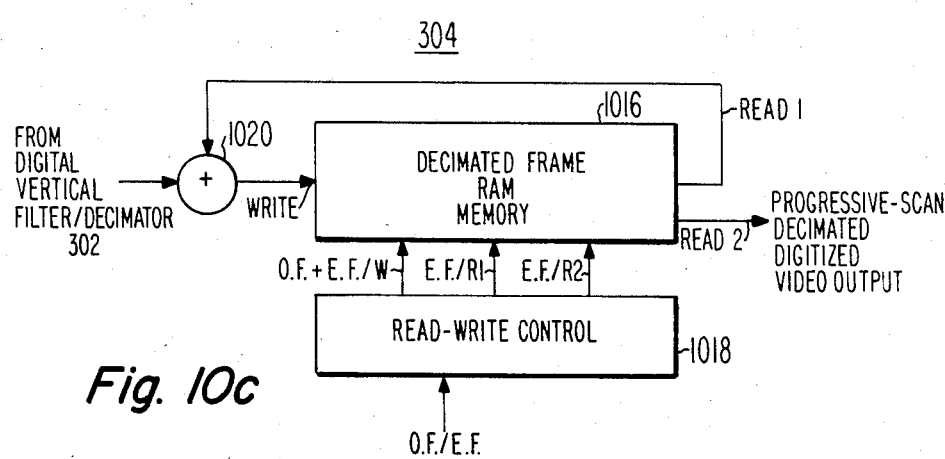

Three different embodiments of interlace to progressive-scan converter 304 are shown respectively in FIGS. 10a, 10b and 10c. The simplest embodiment, shown in FIG. 10a, is comprised of decimated frame memory 1000, odd-field enable gate 1002, even-field enable gate 1004 and summer 1006. Since this is a progressive-scan decimated frame, it includes only one-half the number of scan lines in a frame of the interlaced digitized video input to FIG. 3. Therefore, the number of scan lines of pixel samples that must be stored by a decimated frame memory 1000 is equal to only the number of scan lines of pixel samples in a single one of the two interlaced scanning fields of the interlaced digitized video input to FIG. 3. Further, since each scan line of pixel samples of the interlaced digitized video input to FIG. 3 is passed through horizontal filter/decimator 300, each frame memory 1000 need only store one-half the number of pixel samples per scan lines included in each scan-line of the interlaced digitized video input of FIG. 3. Thus, assuming horizontal filter/decimator 300 to be present, the storage capacity of decimated frame memory 1000 is only one-fourth that required by the prior-art frame memory 108 (shown in FIG. 1a) of converter 100 of FIG. 1. Decimated frame memory 1000 may be comprised either of a serial memory or of a random-access (RAM) memory.

During the occurrence of each odd-field, the output stream of pixel samples from vertical filter/decimator 302 (corresponding to the first partial filter output) is applied through open O.F. enable gate 1002 as a write input to decimated frame memory 1000. During the occurrence of each even field, the output stream of pixel samples from vertical filter/decimator 302 (corresponding to the second partial filter output) is applied through open E.F. enable gate 1004 as a first input to summer 1006. Decimated frame memory 1000 reads out each odd-field pixel sample written therein after a time delay equal to the time interval between corresponding pixel samples of the two interlaced scanning fields. Therefore, each readout odd-field pixel sample is applied to the second input of summer 1006 in time coincidence with the corresponding even field pixel sample applied to the first input of summer 1006. In this manner, each pixel sample of the progressive-scan decimated digitized video output from summer 1006 is comprised of the sum of the corresponding pixel samples from the first and second partial filter outputs of filter/decimator 302.

In FIG. 10b, during both odd and even fields, the output stream of pixel samples from vertical filter/decimator 302 is applied as a first input to summer 1008, and the output from summer 1008 is applied as a write input to a decimated frame tapped serial memory 1010. The output from memory 1010 is applied as a second input to summer 1008 through E.F. enable gate 1012. During the occurrence of each odd field, gate 1012 is closed, so that no recirculation takes place and the output from summer 1008 written into memory 1010 corresponds solely to the first input to summer 1008. Memory 1010 inserts a time delay equal to the time interval between corresponding pixel samples of the interlaced fields. During the occurrence of each even field, when gate 1012 is open, each of the successive delayed pixel samples of the odd field is applied to the second input of summer 1008 in time coincidence with the corresponding pixel sample of the then-occurring even field. The output from summer 1008 (which, during each even field, is comprised of the sum of corresponding pixels of the first and second partial filter outputs) is applied as an input to memory 1010.

A progressive-scan decimated digitized video output is derived from tap 1013 through delayed E.F. enable gate 1014. The delay in opening gate 1014, after the start of each even field, is just equal to the time delay experienced by a pixel sample in traversing the portion of serial memory 1010 between the input thereof and tap 1013.

The embodiment shown in FIG. 10c employs decimated frame RAM memory 1016, read-write control 1018 and summer 1020 to perform the same function as that performed by the arrangement of FIG. 10b. More specifically, during the occurrence of each odd field, the pixel samples of the odd field are written into memory 1016. After a time delay equal to the time interval between corresponding pixel samples of even and odd scanning fields, each pixel sample of the "Read 1" output from memory 1016 is recirculated and added to the corresponding pixel sample of the then-occurring even field, with the sum being written back into memory 1016. The "Read 2" output from memory 1016 is a delayed signal corresponding to the output from gate 1014 of FIG. 10b.

The block diagram shown in FIG. 4 is comprised of vertical digital expander/interpolation filter 400, horizontal digital expander/interpolation filter 402, and interlace to progressive-scan converter 404. Each of vertical expander/interpolation filter 400 and interlace to progressive-scan converter 404 incorporates an embodiment of the present invention. However, horizontal expander/interpolation filter 402 is conventional, except for inclusion therein of a multiplexer operating as a parallel-to-serial converter. Use of a conventional horizontal expander/interpolation filter, while desirable, is not essential to the present invention. However, the need for a parallel-to-serial converter between vertical expander/interpolation filter 400 and interlace to progress-scanned converter 404 is essential.

As indicated in FIG. 4, an interlaced digitized decimated video input is applied to vertical expander/interpolation filter 400. More specifically, the decimated video input is of the type shown in FIG. 2b, in which alternate scan lines of pixels of the non-decimated image shown in FIG. 2a have been removed. Therefore, in the case of a decimated video input, a null time interval follows each scan-line of pixel samples. The null time interval is one scan line in duration, since it has the same length as the removed scan line of the non-decimated image.

Figure 9:
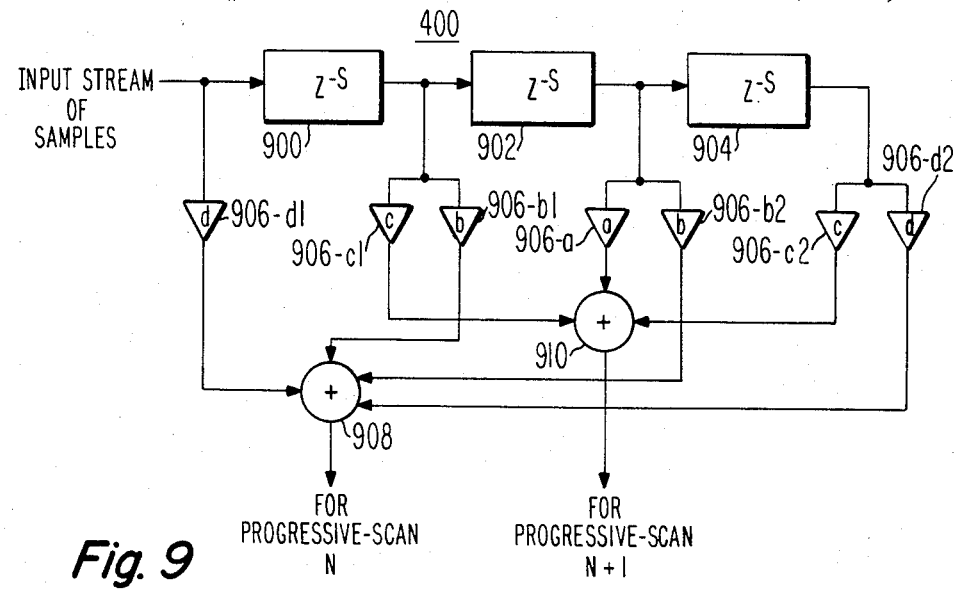
FIG. 9 is an illustrative embodiment of an output-weighted expander/interpolation filter of a type that can be employed as the vertical digital expander/interpolation filter of FIG. 4.

For illustrative purposes, it is assumed that the vertical expander/interpolation filter 400 employs the symmetrical seven-coefficient kernel weighting function of FIG. 6 and has the output-weighted filter configuration shown in FIG. 9. Referring to FIG. 9, an input stream of pixel samples is applied to three cascaded line-delay means 900, 902 and 904, each capable of storing S pixel samples, where S is the number of pixel samples per scan line of the input stream. The input stream of pixel samples is also coupled through first d multiplier 906-$d1$ to a first input of summer 908. The output from delay means 900 is applied through first c multiplier 906-$c1$ as a first input to summer 910 and also through b multiplier 906-$b1$ as a second input to summer 908. The output from delay means 902 is applied through an a multiplier 906-$a$ as a second input to summer 910 and also through second b multiplier 906-$b2$ as a third input to summer 908. The output from delay means 904 is applied through second c multiplier 906-$c2$ as a third input to summer 910 and also through second d multiplier 906-$d2$ as a fourth input to summer 908. The output from summer 908 constitutes a first partial filter output and the output from summer 910 constitutes a second partial filter output. The respective outputs from summers 908 and 910, are derived in parallel during both the occurrence of each odd field and the occurrence of each even field. This results in the total number of scan lines in the output of both partial filters being expanded by a factor of two with respect to the number of scan lines in each successive field of the interlaced input stream.

The expanded scan lines correspond to the scan lines of the non-decimated image shown in FIG. 2a. More specifically, if the non-decimated image shown in FIG. 2a is assumed to be a progressive-scan image, the output from first partial filter summer 908 represents each individual one (denoted N) of a first set comprised of alternate ones of the scan lines of the progressive-scanned non-decimated image while the output from second partial filter summer 910 represents each individual one (denoted N+1) of a second set comprised of the remaining ones of the scan lines of the progressive-scanned, non-decimated image.

Figure 9A:
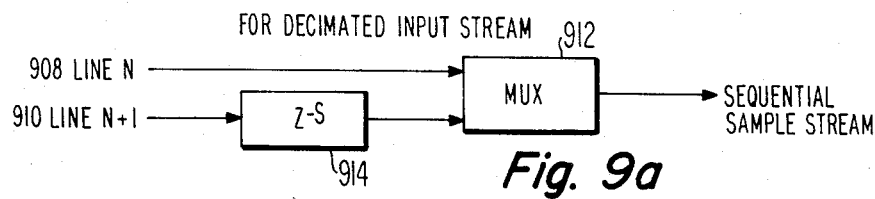
FIGS. 9a and 9b are respective embodiments of parallel-to-serial converters of a type that can be employed in the horizontal digital expander/interpolation filter of FIG. 4 for multiplexing respective parallel-input lines N and N+1, thereby to derive sequential output lines N and N+1 therefrom.

It is essential that each pair of pixel sample scan lines derived in parallel from the respective outputs of summers 908 and 910 of the first and second partial filters be converted to serial form by a suitable parallel-to-serial converter. An example of such a parallel-to-serial converter responsive to a decimated input stream (that is an input stream in which the respective occurrences of two consecutive scan lines of pixel samples are separated by a null time interval at least equal in duration to that of a scan-line) is shown in FIG. 9a. As indicated in FIG. 9a, each scan line N of pixel samples from the output of summer 908 of the first partial filter is applied directly as a first input to MUX 912, while each scan line N+1 of pixel samples from the output of summer 910 of the second partial filter is applied through delay means 914 as a second input to MUX 912. Delay means 914, which is capable of storing all of the pixel samples in a scan line, delays each scan line N+1 by a time interval equal in duration to that of a scan line. Thus, at the output from delay means 914, each scan line N+1 occurs during the occurrence of a null time interval between two successive ones of scan lines N. In this manner, successive scan lines N and N+1 of pixel samples occur sequentially in the output from MUX 912, with each N scan line of pixel samples preceding a corresponding N+1 scan line of pixel samples. The parallel-to-serial converter shown in FIG. 9a may be included in the input portion of the otherwise conventional horizontal expander/interpolation filter 402. However, should horizontal expander/interpolation filter 402 (which is not essential) be omitted, the parallel-to-serial converter shown in FIG. 9a is inserted between the output from vertical expander/interpolation filter 400 and the input to interlace to progressive-scan converter 404.

In the aforesaid discussion of FIGS. 4, 9 and 9a, it has been assumed that an interlaced decimated video input stream of pixel samples is applied to vertical expander/interpolation filter 400. However, there are cases in which it is desired to expand the number of scan lines of pixel samples contained in an interlaced digitized non-decimated video input to vertical expander/interpolation filter 400. An example of such a case is in the image processing apparatus of a high-definition television receiver, in which it is desired to display a higher resolution (e.g. 1050 scan lines) progressively-scanned image display derived from a lower-resolution interlaced (e.g. 525 scan line NTSC input). In this case, there is no null time interval between the end of one scan-line of pixel samples and the beginning of the next scan-line of pixel samples of the input signal. For this reason, the parallel-to-serial converter of FIG. 9a cannot be employed for the purpose of converting the respective parallel outputs of the first and second partial filters from FIG. 9 into a sequential stream of each scan line N of pixel samples followed by a corresponding scan line N+1 of pixel samples. However, the parallel-to-serial converter shown in FIG. 9b can be used for this purpose.

Figure 9B:
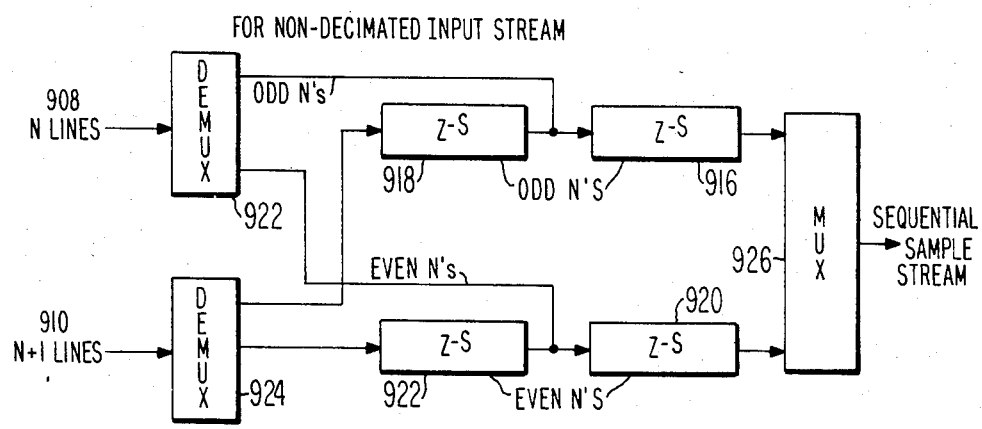

The configuration of FIG. 9b is comprised of a first pair of serially-connected delay means 916 and 918 and a second pair of serially-connected delay means 920 and 922. Each of delay means 916, 918, 920 and 922 is capable of storing one scan-line of pixel samples. When scan-line N has an odd ordinal value in the successively-occurring scan lines of each individual input interlaced scanning field, demultiplexer (DEMUX) 922 forwards each N scan-line pixel sample from the output of summer 908 as an input to delay means 916, and DEMUX 924 forwards each N+1 scan-line pixel sample from the output of summer 910 as an input to delay means 918. However, when scan line N has an even ordinal value in the successively-occurring scan lines of each individual input interlaced scanning field, each scan line pixel sample at the output of DEMUX 922 is applied as an input to delay means 920 and each scan line pixel sample of the output of DEMUX 924 is applied as an input to delay means 922.

The alternate loading of the respective odd N's delay means 916 and 918 and the even N's delay means 920 and 922 causes the odd N's delay means 916 and 918 to be serially read out while the even N's delay means 920 and 922 are being loaded, and vice versa. However, because it is necessary to sequentially read out each N scan line of pixel samples followed by an N+1 scan line of pixel samples from either the odd N's or the even N's serially-connected pair of delay means 916 and 918 or 920 and 922 during a time interval that is equal only to the duration of a single scan line of the input stream of pixel samples, the readout sample rate must be twice that of the input stream sample rate. The sequentially readout pixel samples stored in odd N's pair of serially-connected delay means 916 and 918 are applied as a first input to MUX 926 and the sequentially readout pixel samples stored in the even N's pair of serially-connected delay means 920 and 922 are applied as a second input to MUX 926. MUX 926 provides a single output therefrom in which the respective inputs thereto are combined in interleaved relationship with one another. Thus, the output from MUX 926 is comprised of a continuous stream of pixel samples.

Returning to FIG. 4, the sequential lines N, N+1 output stream of pixel samples from horizontal expander/interpolation filter 402 is applied as an input to interlace to progressive-scan converter 404. Converter 404, which includes a memory capable of storing an entire expanded interpolated frame of pixel samples, can be implemented to read out either a non-delayed or delayed single-shuttered progressive-scan expanded digitized video output, or, alternatively, converter 404 can be implemented to read out a non-delayed double-shuttered progressive-scanned expanded digitized video output. However, converter 404 cannot be implemented to provide a delayed readout double-shuttered progressive-scanned expanded digitized video output, unless the storage capacity of the memory included in converter 404 is increased to more than a single interpolated frame of pixel samples.

Figure 11A:
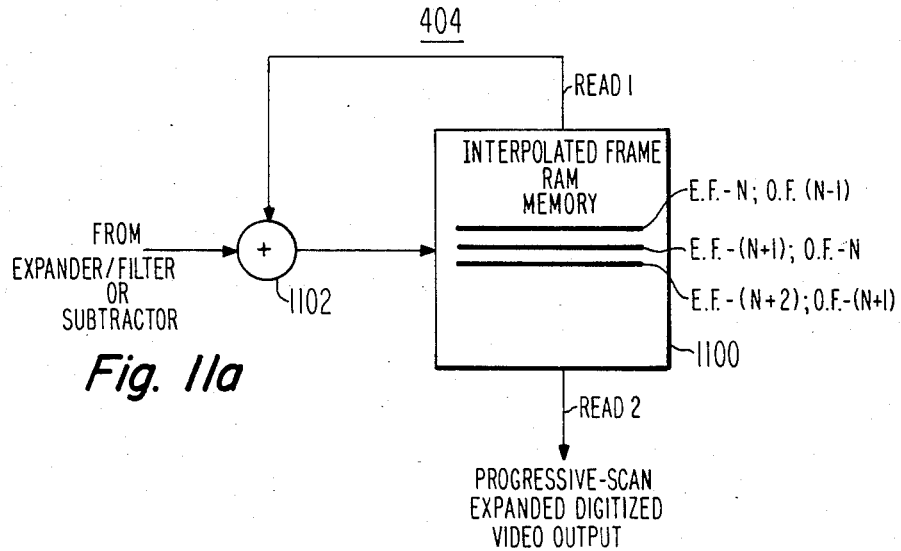
FIGS. 11a and 11b, respectively, illustrate different embodiments of the interlace to progressive-scan converter of FIG. 4.
Figure 11B:
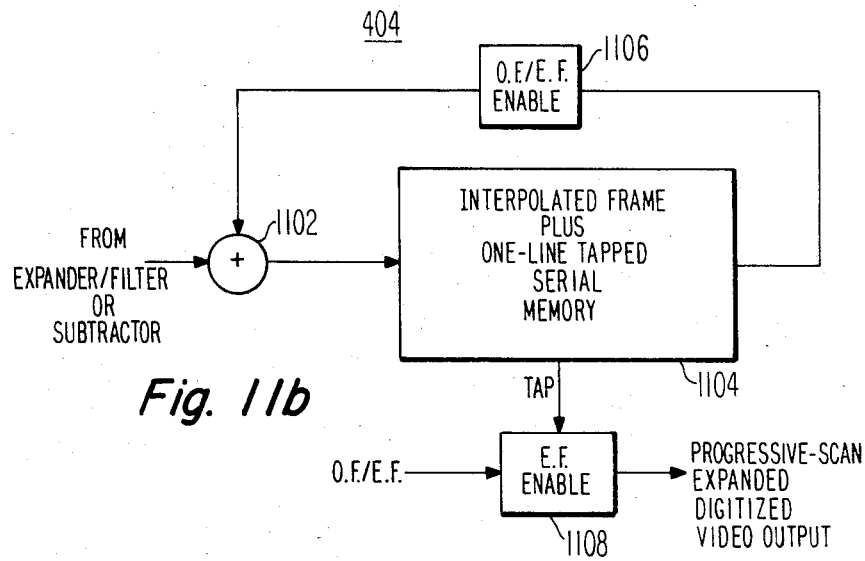

FIGS. 11a and 11b are alternative illustrative implementations of converter 404, each of which provides a delayed, single-shuttered progressive-scanned expanded digitized video output. More specifically, the implementation of converter 404 shown in FIG. 11a is comprised of interpolated frame RAM memory 1100 and summer 1102. The sequential N, N+1 scan-line output stream frame expander/filter 402 is applied as a first input to summer 1102, and the output from summer 1102 is applied as an input to memory 1100. During the occurrence of each odd field, memory 1100 stores each successive pixel sample applied as an input thereto. During the occurrence of each even field, each of the stored samples of the immediately preceding odd field are successively read out on the "Read 1" output and applied as a second input to summer 1102.

As indicated in FIG. 11a, RAM memory 1100 is organized so that each stored pixel from an N scan line of an odd field is read out on "Read 1" in time coincidence with the occurrence of the corresponding N+1 scan-line pixel sample of an even field. Further, each stored N+1 scan-line pixel sample of an odd field is read out on "Read 1" in time coincidence with the occurrence of each N scan-line pixel sample of an even field. During the occurrence of each even field, successive pixel samples from the output of summer 1102 are again stored in memory 1100. As indicated in FIG. 11a, the result is that each of the pixel samples of the respective successive even-field scan lines N, (N+1), (N+2) . . . is summed with the corresponding pixel sample of the respective successive stored odd field scan lines (N−1), N, (N+1) . . . . The pixel samples stored during each even field can be read out on the "Read 2" output from memory 1100 after a time delay which is less than a single field in duration, thereby providing a delayed, single-shuttered progressive-scan expanded digitized video output.

It is apparent that this time delay can have any value from essentially zero to essentially that of an entire single field. If the delay is essentially zero, a non-delayed single-shuttered progressive-scan expanded digitized video output is derived. However, if memory 1100 is read out on "Read 2" twice in response to the occurrence of each even field—first with an essentially zero time delay and then again a second time with a time delay essentially equal to that of an entire single field—a double-shuttered progressive-scan expanded digitized video output results.

The implementation shown in FIG. 11b employs a serial memory rather than a RAM memory. Specifically, the output from summer 1102 is applied as an input to interpolated frame plus one-line tapped serial memory 1104. During the occurrence of each even field, the output from serial memory 1104 is recirculated through E.F. enable gate 1106 and then applied as a second input to summer 1102. The samples (from the output of summer 1102) stored in serial memory 1104 during the occurrence of each even field are derived at a tap of serial memory 1104 and forwarded through delayed E.F. enable gate 1108 as a delayed, single-shuttered progressive-scan expanded digitized video output. More particularly, gate 1108 is opened for a time interval equal in duration to a single field period, which time interval is delayed with respect to each even field by an amount which is just equal to the time delay experienced by a pixel sample between the input and the tap of serial memory 1104.

A non-delayed, double-shuttered progressive-scan expanded digitized video output can be derived by multiplexing the output from summer 1102 during each even field with the output from the right end of serial memory 1104 during each odd field. Further, the output from summer 1102, during each even field, represents a non-delayed, single-shuttered progressive-scan expanded digitized video output.

Figure 5:
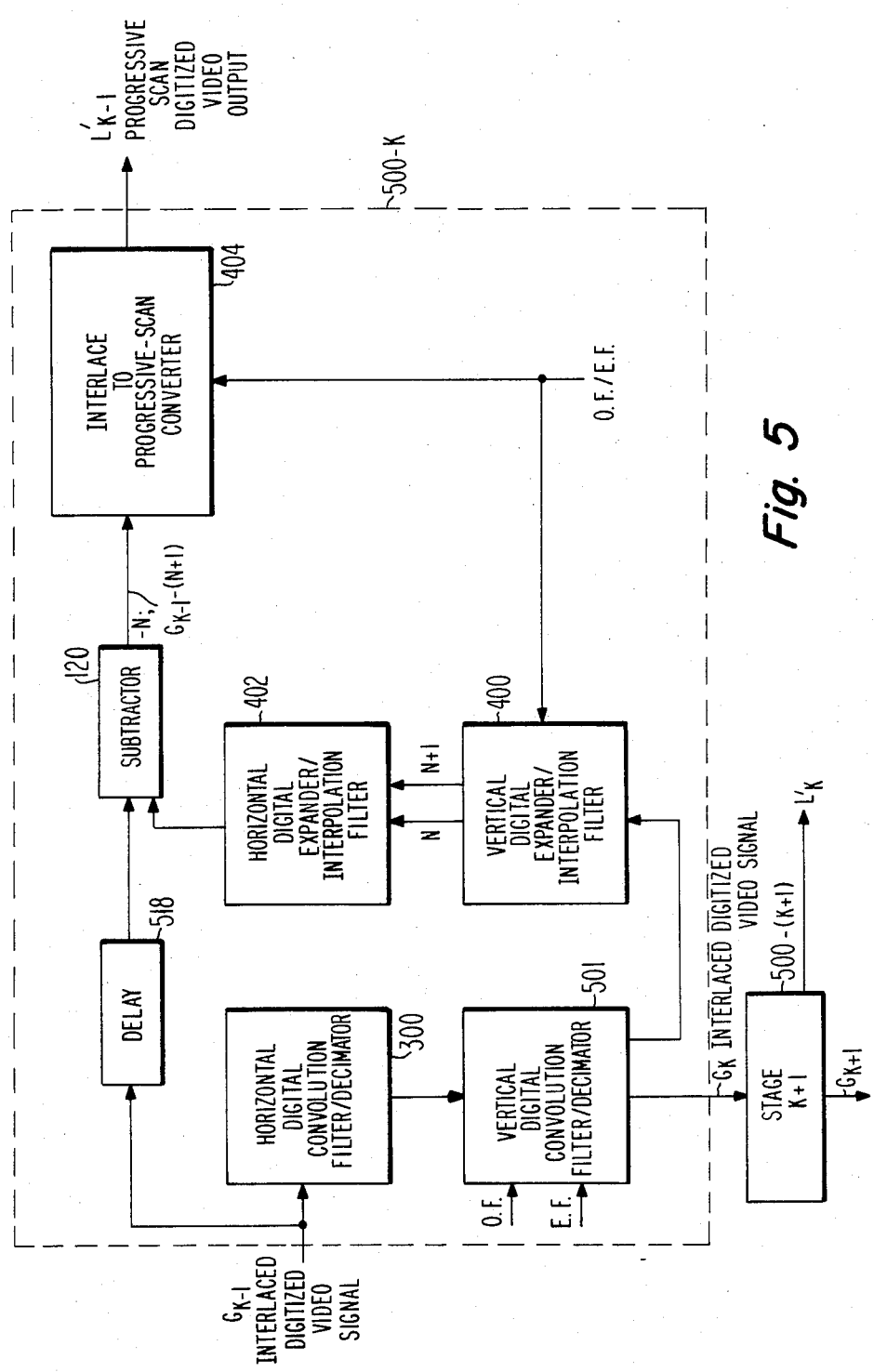
FIG. 5 is a first embodiment of any one of stages 1 through (M−1)

FIG. 5 is directed to a Burt Pyramid analyzer incorporating the present invention, which provides respective delayed, single-shuttered progressive-scan digitized video outputs. The delays, which are inherent, can be used to provide the required time-skew correction for the analyzer outputs. This does away for the need for a separate, extrinsic time-skew correction means 126, employed by the prior-art Burt Pyramid system shown in FIG. 1.

Figure 5A:
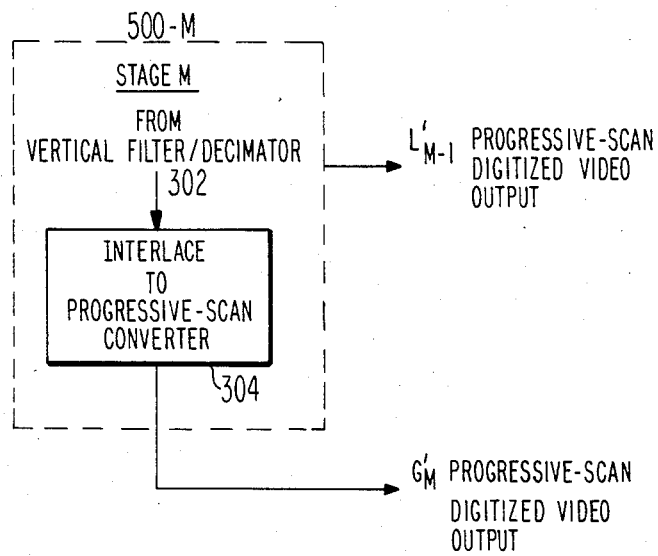
FIG. 5a is a block diagram of a first embodiment of stage M of a Burt Pyramid analyzer incorporating the present invention.

Referring to FIG. 5, there is shown stages 500-K and 500-(K+1), representing any two successive cascaded stages of a Burt Pyramid Analyzer. All of the stages, except the last stage, are assumed to be comprised of the elements of stage 500-K. Elements of the last stage 500-M, are shown in FIG. 5a, discussed in detail below. As indicated, each stage 500-K is comprised of elements 120, 300, 400, 402 and 404, which are identical in structure and function to the correspondingly-identified elements shown in FIG. 1, 3 or 4. Stage 500-K also includes vertical digital convolution filter/decimator 501 (comprised of the structure shown in FIG. 5b), and time-compressed delay means 518.

The $G_{K-1}$ interlaced digitized video signal of the Burt Pyramid analyzer is applied as an input to horizontal filter/decimator 300 of stage 500-K and to time-compressed delay means 518. The output from horizontal filter/decimator 300 is applied as an input to vertical filter/decimator 501. Vertical filter/decimator 501 has a first output which is applied as an input to the following stage 500-(K+1) of the Burt Pyramid analyzer and a second output which is applied as an input to vertical expander/interpolation filter 400.

Figure 5B:
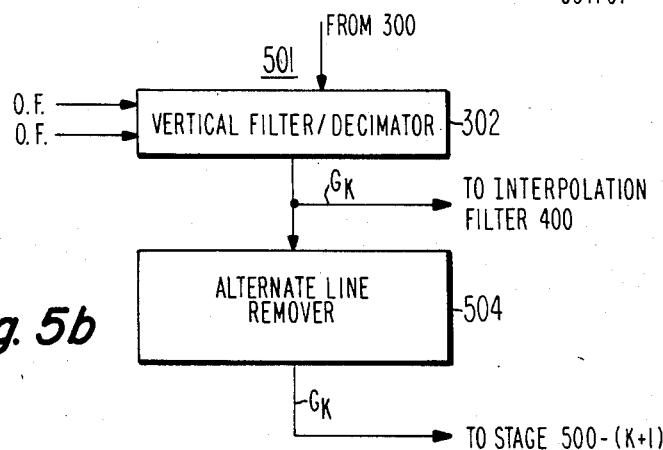
FIG. 5b is a block diagram of the vertical digital convolution filter/decimator of FIG. 5.

As shown in FIG. 5b, vertical filter/decimator 501 is comprised of vertical filter/decimator 302 (which is identical in structure and function to the correspondingly-identified vertical filter/decimator shown in FIG. 3) and alternate line remover 504. The $G_K$ direct-output from vertical filter/decimator 302, that is applied to interpolation filter 400 (FIGS. 5 and 5b), has the same sample density in the vertical dimension as that of the $G_{K-1}$ interlaced digitized video signal input to stage 500-K. Alternate line remover 504 removes alternate scan lines of pixel samples (see FIG. 2b), so that the $G_K$ output from alternate line remover 504, that is applied to stage 500-(K+1), has its sample density in the vertical dimension reduced by one-half with respect to that of the $G_K$ input to alternate line remover 504.

Vertical expander/interpolation filter 400 and horizontal expander/interpolation filter 402 (which operate on the $G_K$ output from vertical filter/decimator 302 of block 501 in a manner identical to that described above in connection with FIG. 4), provides in succession an N scan line of pixel samples followed by an N+1 scan line of pixel samples, at a sample rate that is twice the sample rate of the $G_{K-1}$ interlaced digitized video signal input to time-compressed delay means 518. In order to ensure that corresponding pixels applied to the respective inputs of subtractor 120 from delay means 518 and from the output of horizontal expander/interpolation filter 402 occur in time coincidence with one another, it is essential that delay means 518 compress each scan line of pixel samples applied as an input thereto. More specifically, it is assumed that input pixel samples are continually stored in delay means 518 at the sampling rate of the $G_{K-1}$ input signal. It is further assumed that delay means 518 derives no pixel samples during the time of occurrence of each N scan line of pixel samples from the output of horizontal expander/interpolation filter 402. However, during the time of occurrence of each N+1 scan line of pixel samples from the output of horizontal expander-interpolation filter 402, time-compressed delay means 518 reads out stored pixel samples of a single input scan line at twice the rate it is being inputted thereto from $G_{K-1}$. The output from subtractor 120, which corresponds to the amplitude of each pixel-sample input from delay means 518 minus the amplitude of the corresponding pixel-sample input from horizontal expander/interpolation filter 402.

The respective polarities of the pixel samples applied to each of the two inputs of subtractor 120 are positive. However, the amplitude level of each pixel sample applied as an input to subtractor 120 from delay means 518 is higher than that of the corresponding pixel sample applied as an input to subtractor 120 from horizontal expander/interpolation filter 402. Since no pixel sample is applied from delay means 518 as an input to subtractor 120 during the occurrence of an N scan line of pixel samples applied as an input to subtractor 120 from horizontal expander/interpolation filter 402, each pixel sample at the output of subtractor 120 of an N scan line has an unchanged amplitude level. However, its polarity is reversed to negative (as indicated by "−N" in FIG. 5) by the subtraction process. During the occurrence of an N+1 scan line of pixel samples, the pixel sample at the output-from subtractor 120 has its amplitude level reduced by the subtraction process, but has a positive polarity as indicated in FIG. 5 by "$G_{K-1}-(N+1)$."

Interlace to progressive-scan converter 404 can be implemented in the manner shown either in FIG. 11a or 11b. In this case, the duration of the delay in reading out the progressive-scan digitized video output is adjusted to provide the proper amount of time-skew correction for that stage of the Burt Pyramid. Specifically, converter 404, in FIG. 5, provides a time delay between the occurrence of each even field and the occurrence of each single-shuttered frame of progressive-scan digitized video output which is the proper time-skew correction for that stage 500-K of the Burt Pyramid analyzer. Thus, the progressive-scan digitized video output from converter 404 corresponds with the $L'_{K-1}$ signal of the prior-art Burt Pyramid system shown in FIG. 1, rather than the $L_{K-1}$ signal thereof.

As shown in FIG. 5a, the structure of the last stage 500-M of the Burt Pyramid analyzer is slightly different from the preceding stages 500-K. In particular, the alternate line remover 504 (shown in FIG. 5b) of vertical filter/decimator 501 is replaced, in last stage 500-M, by interlace to progressive-scan converter 304 (which is identical in structure and function to the correspondingly-identified element of FIG. 3). In all other respects, last stage 500M is identical in structure to that of each preceding stage 500K.

Inherent operation of interlace to progressive-scan converter 304 results in the removal of alternate lines. Thus, the $G'_M$ progressive-scan digitized video output from converter 304 has a sampling density of only one half that of the input thereto. Further, the $G'_M$ progressive-scan digitized video output is delayed with respect to the occurrence of an even field by an amount which is adjusted to provide the proper time-skew correction in the remnant signal from the Burt Pyramid analyzer.

While a single-shuttered progressive-scan video signal is useful for many purposes, it may produce noticeable flicker in a displayed image. It is for this reason that double-shuttered progressive-scanned video signals are preferred. However, for the reasons discussed above, neither of the interlaced to progressive-scan converters employed in FIG. 5 or 5a can provide a double-shuttered progressive-scan video output and also provide time-skew correction without an undesirable addition to the storage capacity of the memory portion thereof. However, modification of the implementation of FIGS. 5 and 5a in accordance with FIGS. 5c, 12, 12a and 12b can be employed to overcome the flicker problem.

Figure 5C:
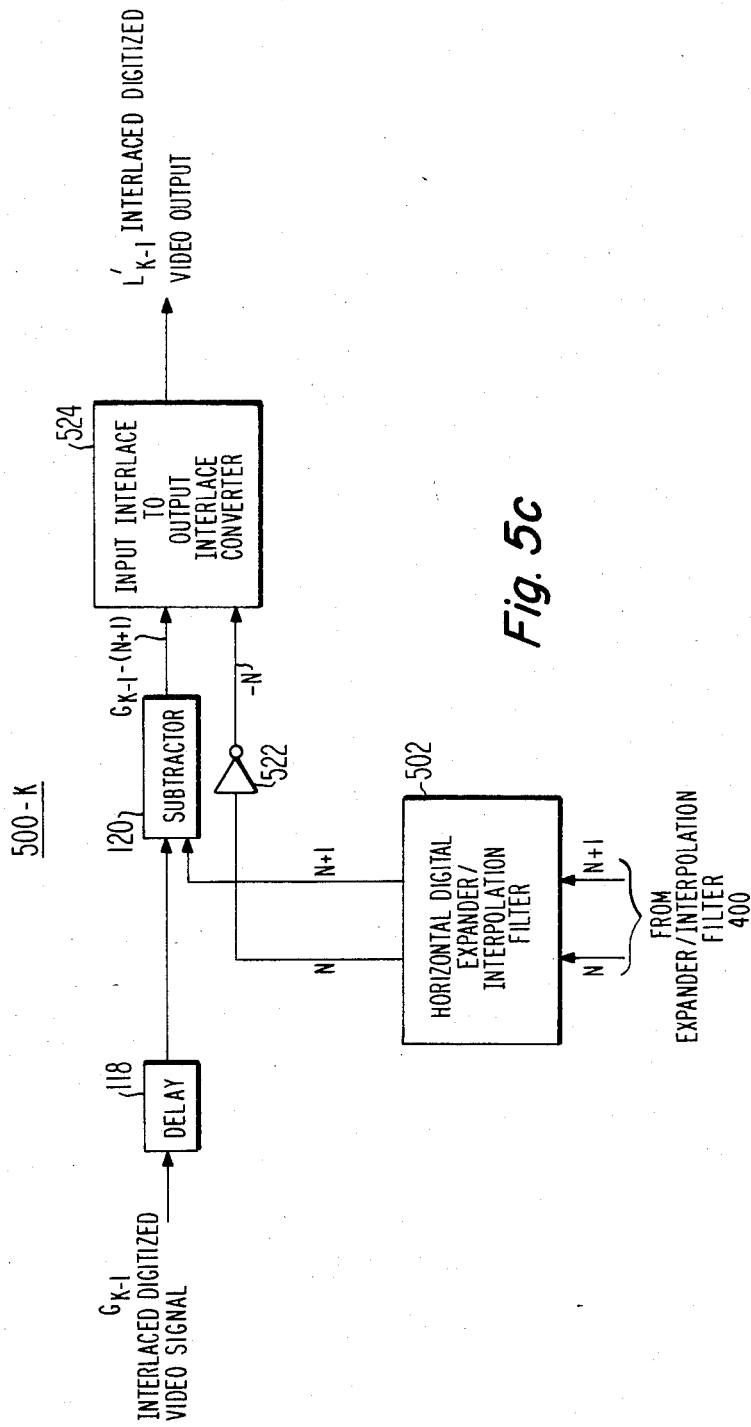
FIG. 5c illustrates a second embodiment of any one of stages 1 through (M−1) of Burt Pyramid Analyzer incorporating the present invention.

Referring to FIG. 5c, horizontal digital expander/interpolation filter 501 has the respective parallel N and N+1 outputs from vertical expander/interpolation filter 400 applied as inputs thereto. Horizontal expander/interpolation filter 502 differs from horizontal digital expander/interpolation filter 402 in two ways. First, horizontal digital expander/interpolation filter 502 does not include a parallel-to-serial converter of the type shown in FIG. 9a or 9b for providing a sequential-line output. Instead, horizontal expander/interpolation filter 502 includes two separate conventional horizontal expander/interpolation filters, one of which is for the N-line channel and the other of which is for the N+1 line channel. Therefore, horizontal expander/interpolation filter 502 derives separate parallel N and N+1 outputs, in which successive pixel samples occur at the same sampling rate as that of the $G_{K-1}$ interlaced digitized video signal input. This does away with the need for any time compression, so that time-compressed delay means 518 of FIG. 5 can be replaced with the simpler delay means 118, of the type discussed in connection with FIG. 1.

The polarity of each pixel sample of the N output from horizontal expander/interpolation filter 501, after being reversed by inverter 522, is applied as a first input to input interlace to output interlace converter 524. Each pixel sample of the N+1 output from horizontal expander/interpolation filter 501 is subtracted from the corresponding pixel sample at the output from delay means 118 by subtractor 120 and then applied as a second input to input interlace to output interlace converter 524. Thus, as indicated in FIG. 5c, the respective "$-N$" and "$G_{K-1}-(N+1)$" signals applied in parallel to input interlace to output interlace converter 524 in FIG. 5c correspond to the respective "$-N$" and "$G_{K-1}-(N+1)$" signals applied in series to interlace to progressive-scan converter 404 in FIG. 5.

Figure 12:
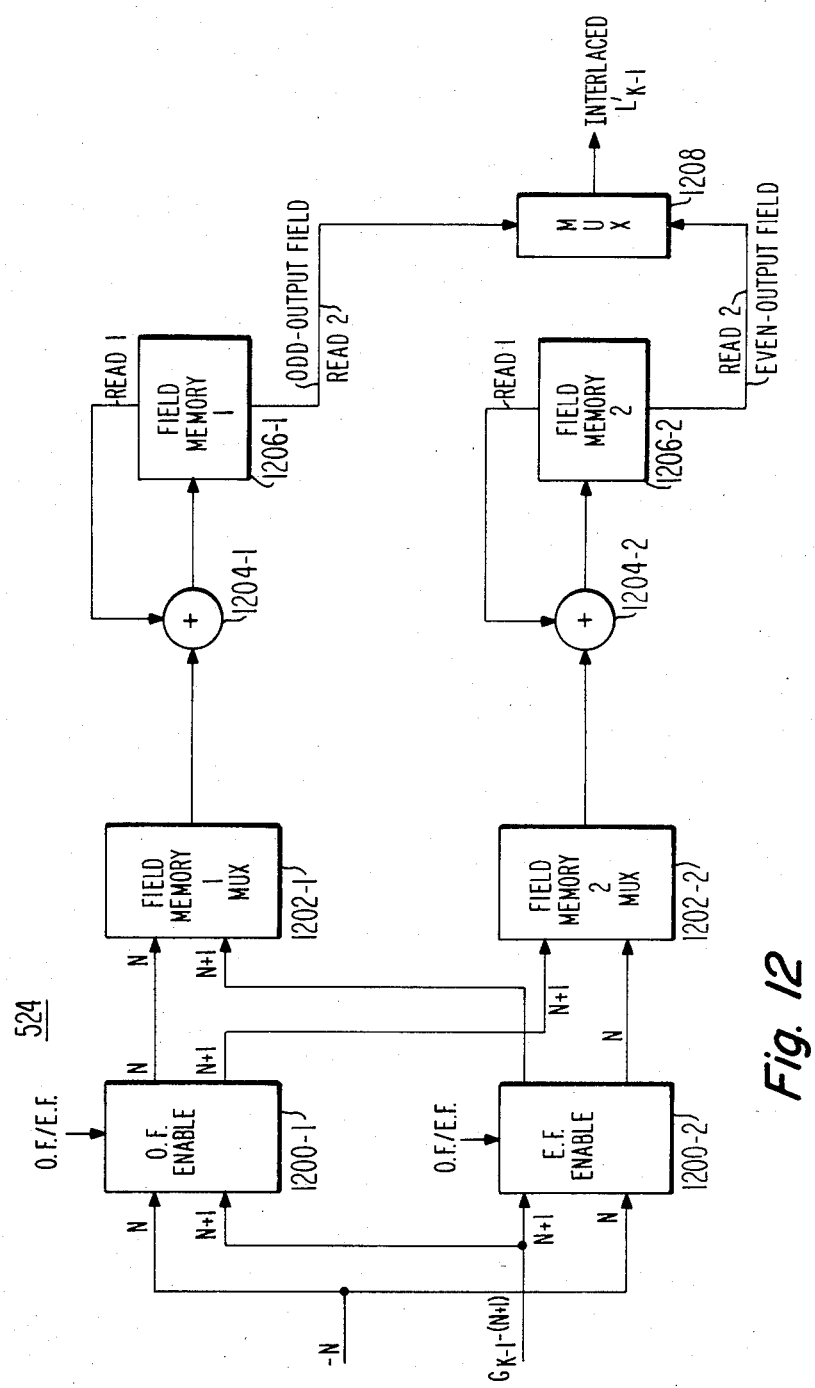
FIG. 12 illustrates an embodiment of the input-interlace to output-interlace converter of FIG. 5c.

Input interlace to output interlace converter 524, which may be structurally embodied in the manner shown in FIG. 12, is distinguished by the fact that samples derived from both an interlaced odd input scanning field and an even scanning field of each successive frame contribute to the pixel samples of the interlaced odd output scanning field of each successive frame. Similarly, the pixel samples of both the interlaced odd input scanning field and of the even input scanning field of each successive frame contribute to the pixel samples of the interlaced even output scanning field of each successive frame.

More specifically, as shown in FIG. 12, the "$-N$" input to converter 524 is applied to both the N input of odd-field enable gate 1200-1 and to the N input of even-field enable gate 1200-2. The "$G_{K-1}-(N+1)$" input to converter 524 is applied to both the N+1 input to odd-field enable gate 1200-1 and the N+1 input to even-field enable gate 1200-2. Gates 1200-1 and 1200-2 operate as a reversing switch for forwarding the N output from gate 1200-1 and N input to Field Memory 1 MUX 1202-1 and the N+1 output from gate 1200-1 as an N+1 input to Field Memory 2 MUX 1202-2 during the occurrence to each odd input scanning field, and for forwarding the N+1 output from gate 1200-2 as an N+1 input to MUX 1202-1 and the N output of gate 1200-2 as an N input to MUX 1202-2 during the occurrence of each even input scanning field. MUX 1202-1 multiplexes the two inputs thereto onto a single output which is applied as a first input to summer 1204-1. Similarly, MUX 1202-2 multiplexes the two inputs thereto onto a single output which is applied as a first input to summer 1204-2. The output from summer 1204-1 is applied to Field Memory 1 1206-1 and the output from summer 1204-2 is applied as an input to Field Memory to 1206-2. Further, each of respective Field Memories 1206-1 and 1206-2 has a storage capacity sufficient to store a single input scanning field of pixel samples. The "Read 1" output from each of the Field Memories 1206-1 and 1206-2 is coupled as a second input to the respective summer 1204-1 or 1204-2. Converter 524 also includes MUX 1208 for multiplexing the respective separate "Read 2" outputs from Field Memories 1206-1, and 1206-2, thereby providing the interlaced $L'_{K-1}$ digitized output from converter 524.

For help in understanding the operation of converter 524, reference is made to the timing diagrams shown in FIG. 12a. As indicated by timing diagram 1210, each successive input frame is comprised of an odd field interval followed by an even field interval. As indicated by timing diagrams 1212 and 1214, odd field enable gate 1200-1 is in its enabled state only during the occurrence of each odd field of successive input frames and even field enable gate 1200-2 is in its enabled state only during the occurrence of each even field of successive input frames. As indicated by timing diagrams 1216 and 1218, Field Memory 1206-1 provides its "Read 1" output only during the occurrence of each even field of successive input frames and provides its "Read 2" output during a field period which is delayed with respect to its "Read 1" output by the proper time skew correction delay (i.e., each "Read 2" output is offset with respect to the occurrence for each even field of successive input frames by this proper time skew correction delay). As shown in diagrams 1220 and 1222, Field Memory 1206-2 provides its "Read 1" output only during the occurrence of each odd field of successive input frames and provides its "Read 2" output during a field period which is delayed with respect to its "Read 1" output by the proper time skew correction delay (i.e. each "Read 2" output is offset with respect to the occurrence of each odd field of successive input frames by the proper time skew correction delay).

Returning to FIG. 12, it is apparent that the "Read 1" output from Field Memory 1206-1 is applied as a second input to summer 1204-1 and the "Read 1" output from Field Memory 1206-2 is applied as a second input to summer 1204-2. It is also apparent that the "Read 2" output from memory 1206-1 constitutes an odd output field of the interlaced $L'_{K-1}$ output signal from MUX 1208 and that the "Read 2" output from memory 1206-2 constitutes the even output field of the interlaced $L'_{K-1}$ output from MUX 1208. As indicated in 5c, the interlaced $L'_{K-1}$ output constitutes the output from converter 524.

In view of the foregoing discussion, it can be seen that during the occurrence of each even field of the successive input frames, summer 1204-1 performs the function of combining each N pixel sample from the odd input field of that frame (representing the output of the first partial filter) with the corresponding N+1 pixel sample of the even input field of that frame (representing the output of the second partial filter). Therefore, during the occurrence of each even field of successive input frames, each pixel sample at the output from summer 1204-1 (which is applied as an input to Field Memory 1206-1) includes contributions from both the first and second partial filters of vertical expander/interpolation filter 400. Hence, each of the pixel samples stored in Field Memory 1206-1 during the occurrence of an even input field is fully filtered by all seven of the multipler coefficients shown in the kernel weighting function of FIG. 6. After a delay equal to the time skew correction, each of these stored fully-filtered pixel samples is read out from Field Memory 1206-1 in the proper phase for a particular one (preferably for the odd-output field shown in FIG. 12) of the two scanning fields of each of the successive output frames.

In general, the operation of summer 1204-2 and Field Memory 1206-2 in deriving fully-filtered pixels is similar to that of summer 1204-1 and Field Memory 1206-1, discussed above. However, as indicated in the timing diagrams of FIG. 12a, there is an offset in timing of a single scanning field between the respective "Read 1" and "Read 2" outputs of Field Memory 1206-2 with respect to the corresponding outputs of Field Memory 1206-1. The result is that each fully-filtered pixel sample of Field Memory 1206-2 is comprised of the sum of corresponding pixel samples derived respectively from an N+1 line (corresponding to the second partial filter) of the odd field of the current one of successive input frames and an N line (corresponding to the first partial filter) of the even field of the input frame that immediately precedes the current one of the successive input frames. This differs from the case of Field Memory 1206-1 in which corresponding N and N+1 pixel samples of the odd and even fields of the same one of the successive input frames are summed by summer 1204-1.

The fully-filtered pixel samples stored in Field Memory 1206-2 during each odd input scanning field are read out after a time skew correction delay in the proper phase to provide an output scanning field (even) different from that provided by the "Read 2" output of Field Memory 1206-1. MUX 1208 then combines the respective "Read 2" outputs of Field Memories 1206-1 and 1206-2 to provide successive output frames of interlaced odd/even scanning fields, each comprised of fully-filtered pixel samples.

In order that the remnant signal $G'_N$ of the Burt Pyramid analyzer has the same interlaced output form as $L'_{K-1}$, it is necessary to replace the stage M interlace to progressive-scan converter of FIG. 5a (which incorporates a decimated frame memory) with an appropriate input-interlace to output-interlace converter which also provides decimation. The structural implementation of such an appropriate input-interlace to output-interlace converter for deriving a $G'_M$ interlace video output is shown in FIG. 12b.

Figure 12B:
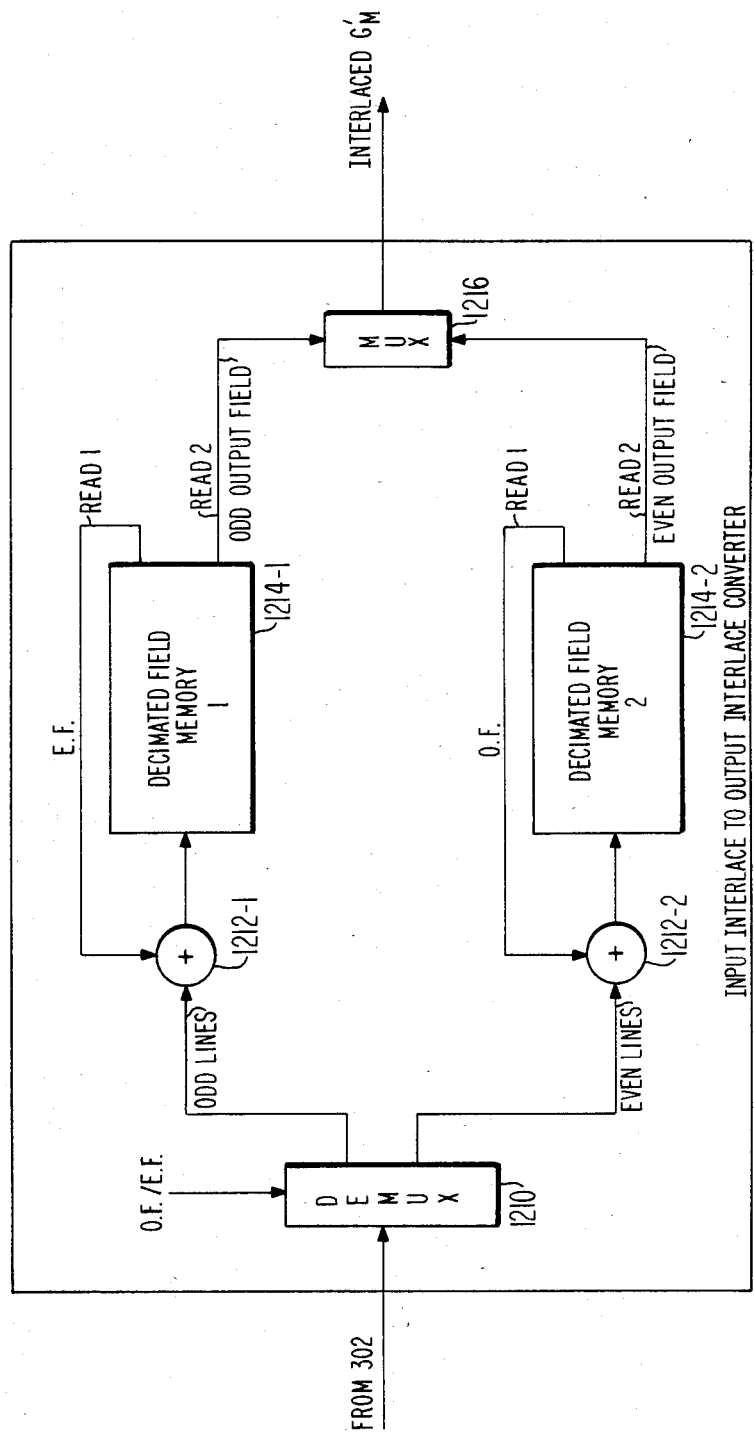
FIG. 12b illustrates an input-interlace to output-interlace converter to be used in a modification of FIG. 5a, which cooperates with the FIG. 5c embodiment of the Burt Pyramid analyzer.

As shown in FIG. 12b, an output from a vertical filter/decimator having a structure corresponding to that of a vertical filter/decimator 302 (rather than that of vertical filter/decimator 501 shown in FIG. 5b) is applied as an input to DEMUX 1210. DEMUX 1210 has an odd-even (O.F./E.F.) control signal applied thereto for causing DEMUX 1210 to forward its input to its odd-lines output during the occurrence of each odd line of both odd and even fields and to forward input to its even-lines output during the occurrence of each even line of both odd and even input fields. The odd-lines output from DEMUX 1210 is applied as a first input to summer 1212-1 and the even-lines output from DEMUX 1210 is applied as a first input to summer 1212-2. The output from summer 1212-1 is applied as an input to Decimated Field Memory 1 1214-1 and the output from summer 1212-2 is applied as an input to Decimated Field Memory 2 1214-2. During the occurrence of each even input field, the "Read 1" output from Decimated Memory 1214-1 is applied as a second input to summer 1212-1. Similarly, during the occurrence of each odd input field, the "Read 1" output from Decimated Memory 1214-2 is applied as a second input to summer 1212-2. During a field period that is offset with respect to each even input field by an appropriate time-skew correction delay. Decimated Field Memory 1214-1 provides a "Read 2" output (corresponding to the odd output field of the $G'_M$ remnant signal from the input interlace to output-interlace converter) to the first input of MUX 1216. Similarly, during a field period which is offset with respect to each odd input field by the appropriate time-skew correction delay, Decimated Field Memory 1214-2 provides a "Read 2" output (corresponding to the even output field of the $G'_M$ remnant signal from the input-interlace to output interlace converter) to the second input of MUX 1216. MUX 1216 multiplexes the two inputs thereto to provide the interlaced $G'_M$ remnant signal from the converter.

The number of odd lines in each input field is only one-half of the total number of lines in that input field. Therefore, since summer 1212-1 combines each pixel sample of an odd line of the even field of each of successive input frames with the corresponding pixel sample of an odd line of the odd field that input frame, the total number of scan lines that are stored by Decimated Field Memory 1214-1 is only one-half the total number of scan lines in either in an odd or an even input field. Further, since each odd field corresponds with the output from a first partial filter and each even field corresponds with the output from a second partial filter, each pixel sample at the output of summer 1212-1, during the occurrence of an even input field, represents a fully filtered pixel sample.

In general, summer 1212-2 and Decimated Field Memory 1214-2 operate in the same manner as do summer 1212-1 and Decimated Field Memory 1214-1, discussed above. The only significant difference between them is in the timing. More specifically, the "Read 1" output from Decimated Field Memory 1214-2 occurs only during the odd input field of each successive input frame, while the "Read 1" output from Decimated Field Memory 1214-1 occurs only during the even input field of each successive input frame. Therefore, each fully-filtered pixel sample at the output of summer 1212-2, during the odd field of any one of the successive input frames, represents the sum of the corresponding pixel samples of the odd field of that one of the successive input frames and the corresponding pixel sample of the even field of the immediately preceding one of the successive input frames. Thus, the timing of the interlaced $G'_M$ converter, shown in FIG. 12b, occurs in synchronization with the timing of the interlaced $L'_{K-1}$ signal from converter 524 (shown in FIGS. 5 and 12).

We claim:

1. In a system for digitally processing in real time an applied interlaced video-input digital signal, wherein said video-input signal is temporally comprised of successively-occurring scan-lines of pixel samples of at least one frame composed of F separate line-interlaced scanning fields of a raster-scanned two-dimensional image, where F is a first plural integer; wherein said system includes filter apparatus comprised of a one-dimensional m-tap digital filter/decimator and/or expander/interpolation filter, where m is a second plural integer that is larger than said first plural integer F, said filter apparatus being operative in that one of the two dimensions of said image that is orthogonal to said raster scan lines for deriving a progressive-scan video output digital signal comprised of successively-occurring scan-lines of pixel samples; and wherein each of said m taps has a predetermined multiplier coefficient associated therewith; the improvement wherein said filter apparatus filter comprises:

a set of D delay means, where D is a predetermined integer having a value such that $D < (m-1)$, each of which delay means is capable of storing one scan-line of pixel samples;

a plurality of F partial filters each of which has a separate and distinct subset of said m predetermined multiplier coefficients individually associated therewith, the maximum number of said coefficients contained in any of said subsets being no greater than $(D+1)$;

each of said plurality of F partial filters being comprised of at least a subset of said D delay means, with one or more of said delay means of said set being common to all of said plurality of F partial filters; and an interlace to progressive-scan converter comprised of a progressive-scan frame memory and means including a summer that are coupled to said plurality of F partial filters in accordance with the ordinal value of the then-occurring one of the F separate line-interlaced scanning fields, said progressive-scan frame memory and said means including said summer being operative during the successive occurrences of each of said F separate line-interlaced scanning fields of said frame of said video-input signal to sum corresponding pixel samples applied thereto that are derived from the respective outputs of each of said plurality of F partial filters.

2. The system defined in claim 1, wherein said interlaced video input signal is comprised of a continuous succession of said input frames, and each of said input frames is composed of only two interlaced scanning fields that consist of an odd field followed by an even field, whereby the value of said first plural integer F is two.

3. The system defined in claim 2, where D is equal to the largest integer that is smaller than one-half m.

4. The system defined in claim 1, in which said filter apparatus is comprised of said filter/decimator and said filter/decimator further includes:

a set of $D+1$ multiplexers common to said F partial filters with each of D ones of said multiplexers being individually associated with a different one of said D delay lines, said multiplexers being selectively controlled in accordance with the ordinal value of the then-occurring one of said F line interlaced scanning fields for rendering effective a corresponding one of said separate and distinct subsets of said m predetermined coefficients to thereby provide a different selected one of said F partial filters during each successive one of said F line-interlaced scanning fields.

5. The system defined in claim 4, wherein:

said progressive-scan frame memory is a decimated frame memory that is operative to delay pixel samples applied thereto for a time interval equal to the difference in time of occurrence of corresponding pixel samples between successive ones of said F interlaced scanning fields;

said decimated frame memory and said means including said summer are operative during each of said second-occurring to said Fth occurring one of said F interlaced scanning fields to add each individual pixel sample from the output of the selected one of the F partial filters during the then-occurring scanning field to the sum of all the respective samples corresponding to that individual pixel sample from the respective outputs of those ones of the F partial filters which were selected during those ones of the F interlaced scanning fields that preceded to the then-occurring scanning field; and said decimated frame memory and means including said summer are operative subsequent to the end of said $(F-1)$th interlaced scanning field for deriving said progressive-scan video output signal.

6. The system defined in claim 5, wherein said interlaced video input signal is comprised of a continuous succession of said input frames, and each of said input frames is composed of only two interlaced scanning fields that consist of an odd field followed by an even field, whereby the value of said first plural integer F is two.

7. The system defined in claim 6, where D is equal to the largest integer that is smaller than one-half m.

8. The system defined in claim 4, wherein each of said F partial filters is an input-weighted filter.

9. The system defined in claim 4, wherein each of said F partial filters is an output-weighted filter.

10. The system defined in claim 1, in which said filter apparatus is comprised of an expander/interpolation filter; wherein:

said F partial filters are each output-weighted filters that are simultaneously operative during each and every one of said F interlaced scanning fields thereby to derive in parallel F separate partial filter outputs during each and every one of said F interlaced scanning fields; and a parallel-to-serial converter incorporating at least $(F-1)$ serially-connected delay means each of which is capable of storing one scan line of pixel samples, said parallel-to-serial converter being operative during each and every interlaced scanning field to convert the respective scan lines of pixel samples that appear in parallel at the respective outputs of said F partial filters into a serial stream of F scan lines of pixel samples during a time interval no longer than the time period between the beginnings of two successive scan lines of any one of said F interlaced scanning fields.

11. The system defined in claim 10, wherein said interlaced video input signal is a decimated interlaced video input signal.

12. The system defined in claim 10, wherein:

said progressive-scan frame memory is an interpolated frame memory that is operative to delay pixel samples applied thereto by a time interval equal to the sum of the difference in time of occurrence of corresponding pixel samples between successive ones of said F interlaced scanning fields and the time duration of one scan line of pixel samples appearing at the serial output from said serial-to-parallel converter;

said interpolated frame memory and said means including said summer are operative (1) to derive a serial stream of pixel samples each of which is a function of the sum of a corresponding first pixel sample appearing at the serial output of said parallel-to-serial converter and a delayed corresponding second pixel sample from said interpolated frame memory, and (2) to apply said derived serial stream of pixel samples as an input to said interpolated frame memory; and said interpolated frame memory and means including said summer are operative subsequent to the end of said (F−1)th interlaced scanning field for deriving said progressive-scan video output signal.

13. The system defined in claim 12, wherein said interlaced video input signal is comprised of a continuous succession of said input frames, and each of said input frames is composed of only two interlaced scanning fields that consist of an odd field followed by an even field, whereby the value of said first plural integer F is two.

14. The system defined in claim 13, where D is equal to the largest integer that is smaller than one-half m.

15. The system defined in claim 12, wherein each pixel sample of said derived serial stream of pixel samples is substantially equal to the sum of said corresponding first and second pixel samples.

16. In a system incorporating a Burt Pyramid analyzer having at least one stage for digitally processing in real time an interlaced digital video signal that is applied as an input to that stage, in which said video-input signal is temporally comprised of successively-occurring scan lines of pixel samples of successive input frames, each of said frames being composed of two line-interlaced scanning fields of a raster-scanned two-dimensional image; the improvement wherein each stage of said analyzer includes;

digital filter/decimation means for deriving a first video-output signal in response to said video-input signal applied as an input thereto, said filter/decimation means being operative in that one of the two dimensions of said image that is orthogonal to said raster scan lines (1) as a first partial filter employing a first subset comprised of alternate weights of a first given kernel weighting function composed of at least three weights for all scan lines of the first-occurring one of said two fields of each successive input frame, and (2) as a second partial filter employing a second subset comprised of the remaining weights of said first given kernel weighting function for all scan lines of the second-occurring one of said two fields of each successive input frame;

digital expansion/interpolation filter means for deriving a second video-output signal in response to said first video-output signal applied as an input thereto, said expansion/interpolation filter means being operative in said one of the two dimensions of said image (a) as a third partial filter employing a first subset comprised of alternate weights of a second given kernel weighting function comprised of at least three weights for all scan lines of both of said two fields of each successive input frame, and (b) as a fourth partial filter employing a second subset comprised of the remaining weights of said second given kernel weighting function for all scan lines of both of said two fields of each successive input frame; and signal translating means responsive to said video-input signal and said second video-output signal applied thereto for deriving a third video-output signal representing a bandpass output from that stage of said Burt Pyramid analyzer, said signal translating means being operative (A) to effectively combine the respective pixel samples of said second video-output signal that define the output of said third partial filter for a selected one of said two fields of each successive input frame with the corresponding pixel samples of said second video-output signal that define the output of said fourth partial filter for a first non-selected field that is temporally contiguous with said selected one of said two fields of each successive input frame and (B) to effectively combine the respective pixel samples of said second video-output signal that define the output of said fourth partial filter for said selected one of said two fields of each successive input frame with the corresponding pixel samples of said second video-output signal that define the output of said third partial filter for a second non-selected field that is temporally contiguous with said selected one of said two fields of each successive input frame.

17. The system defined in claim 16, wherein:

said Burt Pyramid analyzer is comprised of an ordinal group of M stages, where M is a given integer; and said Mth stage further includes second signal translation means responsive to said first video-output signal of said Mth stage applied thereto for deriving a fourth video-output signal representing the remnant output from said Burt Pyramid analyzer;

said second signal translating means being operative to effectively combine the respective pixel samples of said first video-output signal of said Mth stage that define the output of said second partial filter for said second-occurring field of each successive input frame with the corresponding pixel samples of said first video-output signal of said Mth stage that define the output of said first partial filter for a first-occurring field that is contiguous with the second-occurring field of that input frame.

18. The system defined in claim 17, wherein:

M is a given plural integer; and each of the first through the (M−1)th stages of said Burt Pyramid analyzer further includes means responsive to said first video-output signal of that stage applied thereto for removing therefrom alternate scan lines of pixel samples thereby to derive a fifth video-output signal from that stage, said fifth video output signal from each of said first through the (M−1)th stages of said Burt Pyramid analyzer being applied as the video input signal to its immediately following one of the second through the Mth stages of said Burt Pyramid analyzer.

19. The system defined in claim 16, wherein:

said expander/interpolation filter means includes a time-compressed parallel-to-serial converter for deriving a format for said second video-output signal in which, within the duration of each scan line of said video-input signal, each scan line of pixel samples from said third partial filter is followed by a scan line of corresponding pixel samples from said fourth partial filter;

said signal translation means is comprised of subtraction means for subtracting the value of each pixel sample applied to a second input thereof from the value of a corresponding pixel sample applied to a first input thereof to thereby derive at its output respective pixel samples each representing a difference value, means for applying said second video-output signal to said second input of said subtraction means, and time-compressed delay means for applying the respective pixel samples of each scan line of said video-input signal to said first input of said subtraction means in time coincidence with the application to the second input thereof of the corresponding pixel samples of the corresponding scan line of said fourth partial filter; and said signal translation means is further comprised of an interlace to progressive scan converter responsive to the output of said subtraction means applied thereto for deriving a delayed single-shuttered progressive scan video output as said third video-output signal of each stage of said Burt Pyramid analyzer, said interlace to progressive scan converter including means employing said second-occurring field of each successive input frame as said selected one of said two fields and employing said first-occurring field of that same input frame as both said first and said second non-selected fields.

20. The system defined in claim 19, wherein:

said Burt Pyramid analyzer is comprised of an ordinal group of M stages, where M is a given integer; and said Mth stage further includes second signal translation means comprised of an interlace to progressive scan converter responsive to said first video-output signal of said Mth stage applied thereto for deriving a fourth video output signal representing a delayed single-shuttered remnant video-output from said Burt Pyramid analyzer, said interlace to progressive-scan converter including means for effectively combining the respective pixel samples of said first video-output signal of said Mth stage that define the output of said second partial filter for said second-occurring field of each successive input frame with the corresponding pixel samples of said first video-output signal of said Mth stage that define the output of said first partial filter for the first-occurring field of that same input frame.

21. The system defined in claim 16, wherein:

said signal translation means is comprised of subtraction means for subtracting the value of each pixel sample applied to a second input thereof from the value of a corresponding pixel sample applied to a first input thereof to thereby derive at its output respective pixel samples each representing a difference value, an inverter for inverting at its output the polarity of each pixel sample applied to its input, means for applying the respective pixel samples of all scan lines of said second video-output signal that represent the output of said third partial filter as said input to said inverter and for applying the respective pixel samples of all scan lines of said second video output signal that represent the output of said fourth partial filter as said second input to said subtraction means, and delay means for applying the respective pixel samples of each scan line of said video-input signal to said first input of said subtraction means in time coincidence with the application to the second input thereof of the corresponding pixel samples of the corresponding scan line of said fourth partial filter; and said signal translation means is further comprised of an input-interlace to output-interlace converter responsive to the respective outputs of said subtraction means and said inverter applied thereto for deriving a delayed interlaced video output as said third video-output signal of each stage of said Burt Pyramid analyzer, said input-interlace to output-interlace converter including means employing said second-occurring field as said selected one of said two fields of each successive input frame, and employing said first-occurring field of that same input frame as said first non-selected field and said first occurring field of the immediately succeeding output frame as said second non-selected field.

22. The system defined in claim 21, wherein:

said Burt Pyramid analyzer is comprised of an ordinal group of M stages, where M is a given integer; and said Mth stage further includes second signal translation means comprised of an input-interlace to output-interlace converter responsive to said first video-output signal of said Mth stage applied thereto for deriving a fourth video output signal representing a delayed interlaced remnant video output from said Burt Pyramid analyzer said input-interlace to output-interlace converter including means for effectively combining the respective pixel samples of said first video-output signal of said Mth stage that define the output of said second partial filter for said second-occurring field of each input frame with the corresponding pixel samples of said first video output signal of said Mth stage that defines the output of said first partial filter (1) for the first-occurring field of that same input frame to derive one of two interlaced fields of each successive remnant video output frame and (2) for the first-occurring field of the immediately succeeding input frame to derive the other of said two interlaced fields of each successive remnant video output frame.

* * * * *